US012260170B2

(12) United States Patent
Chen et al.

(10) Patent No.: US 12,260,170 B2
(45) Date of Patent: Mar. 25, 2025

(54) ABILITY TO ADD NON-DIRECT ANCESTOR COLUMNS IN CHILD SPREADSHEETS

(71) Applicant: Oracle International Corporation, Redwood Shores, CA (US)

(72) Inventors: Xiameng Chen, Foster City, CA (US); Shaun Logan, Melrose, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/876,327

(22) Filed: Jul. 28, 2022

(65) Prior Publication Data

US 2024/0037325 A1 Feb. 1, 2024

(51) Int. Cl.
*G06F 16/28* (2019.01)
*G06F 16/22* (2019.01)
*G06F 40/18* (2020.01)

(52) U.S. Cl.
CPC .......... *G06F 40/18* (2020.01); *G06F 16/221* (2019.01); *G06F 16/282* (2019.01)

(58) Field of Classification Search
CPC ....... G06F 40/18; G06F 16/221; G06F 16/282
See application file for complete search history.

(56) References Cited

U.S. PATENT DOCUMENTS

| | | | |
|---|---|---|---|
| 8,205,010 B1 | 6/2012 | Black | |
| 10,467,593 B2 | 11/2019 | White | |
| 10,885,067 B2 | 1/2021 | Taylor, III | |
| 11,042,699 B1 | 6/2021 | Sayre | |
| 11,113,041 B2 | 9/2021 | Stachura | |
| 11,182,831 B1 | 11/2021 | Faradjev | |
| 11,308,098 B2 | 4/2022 | Poddar | |
| 11,367,139 B2 | 6/2022 | Cunningham | |
| 11,500,839 B1 * | 11/2022 | Pedapati | ............ G06F 16/2282 |
| 2010/0205520 A1 | 8/2010 | Parish | |
| 2010/0211862 A1 | 8/2010 | Parish | |
| 2013/0013995 A1 | 1/2013 | Khen | |
| 2014/0149836 A1 | 5/2014 | Bedard | |
| 2014/0282013 A1 | 9/2014 | Amijee | |
| 2016/0224536 A1 | 8/2016 | Thomas | |
| 2017/0098008 A1 | 4/2017 | Kemmer | |

(Continued)

OTHER PUBLICATIONS

Bakke et al. A spreadsheet-based user interface for managing plural relationships in structured data (Year: 2011).*

*Primary Examiner* — Jennifer N Welch
*Assistant Examiner* — Amy P Hoang
(74) *Attorney, Agent, or Firm* — Trellis IP Law Group, PC

(57) ABSTRACT

Example embodiments facilitate augmenting a client-side worksheet of a spreadsheet with context information retrieved from non-direct ancestor worksheets of the client-side worksheet. A spreadsheet plug-in enables retrieval of the context information from a server system, e.g., cloud-based database, via one or more web services. In a specific embodiment, the context information represents one or more data dimensions, e.g., worksheet columns, retrieved via the server system form one or more remote databases and populated into one or more non-direct ancestor worksheets (e.g., grandparent worksheets, great grandparent worksheets, etc.). Then those data dimensions are displayed in the client-side descendant worksheet. The user can now efficiently edit the worksheet while viewing relevant context information in the worksheet.

16 Claims, 21 Drawing Sheets

(56) References Cited

U.S. PATENT DOCUMENTS

| | | |
|---|---|---|
| 2018/0107671 A1 | 4/2018 | Plenos |
| 2018/0357262 A1* | 12/2018 | He .................... G06F 16/285 |
| 2019/0057111 A1 | 2/2019 | Chung |
| 2019/0095413 A1* | 3/2019 | Davis .................... H04L 67/565 |
| 2019/0187962 A1 | 6/2019 | Stachura |
| 2020/0042648 A1 | 2/2020 | Rao |
| 2020/0043091 A1 | 2/2020 | Courbage |
| 2020/0150938 A1 | 5/2020 | Stachura |
| 2020/0409947 A1* | 12/2020 | Seiden ................ G06F 16/2445 |
| 2021/0313830 A1 | 10/2021 | Dowler |
| 2021/0326520 A1 | 10/2021 | Davis |
| 2021/0357582 A1 | 11/2021 | Davis |
| 2021/0397420 A1 | 12/2021 | Stachura |
| 2022/0067271 A1 | 3/2022 | Logan |
| 2022/0366129 A1* | 11/2022 | Dong .................... G06F 16/2246 |

\* cited by examiner

*Available Business Object Fields*

Filter

| Business Object | Field ID | Field Title | Description | Data Type |
|---|---|---|---|---|
| ExpenseReports | ExpenseReportID | Expense Report ID | | Integer |
| ExpenseReports | PartitionID | Partition ID | | String |
| ExpenseReports | Purpose | Purpose | | String |
| ExpenseReports | FinalApprovalDate | Final Approval Date | | DateTime |
| ExpenseReports | ReporterID | Reporter ID | | Integer |
| ExpenseReports | ApproverID | Approver ID | | Integer |
| ExpenseReports | StatusID | Status ID | | Integer |
| ExpenseReports | RevisionNum | Revision Num | | Number |
| Expenses | ExpenseID | Expense ID | | Integer |
| Expenses | PartitionID | Partition ID | | String |
| Expenses | Justification | Justification | | String |
| ExpenseItemizations | ExpenseItemID | Expense Item ID | | Integer |

ABILITY TO ADD NON-DIRECT ANCESTOR COLUMNS IN CHILD SPREADSHEETS

CROSS REFERENCES TO RELATED APPLICATIONS

This application is related to the following application, U.S. patent application Ser. No. 17/008,503 entitled ORCHESTRATION OF CRUD OPERATIONS FOR A HIERARCHICAL WEB SERVICE DATA MODEL IN A SPREADSHEET, filed on Aug. 31, 2020, which is hereby incorporated by reference as if set forth in full in this application for all purposes.

BACKGROUND

The present application relates to computing, and more specifically to software, systems, and methods for using client-side software applications and accompanying User Interfaces (UIs) to use and/or interact with server-side computing resources, e.g., data and/or functionality.

Systems and methods for enabling client-side computing resources (e.g., data, devices, software functionality, etc.) and accompanying devices to use or interact with server-side computing resources are employed in various demanding applications, including mobile enterprise applications; cloud data storage services for personal computers; browsers for accessing financial websites and accounts, and so on. Such applications often demand efficient, versatile, and user friendly systems and methods that facilitate productivity and informed decision-making.

Client-side computing resources (e.g., personal computers, mobile devices, accompanying software, data, etc.) and server-side computing resources (e.g., cloud-based data storage, server-side software applications, etc.) can be particularly important in enterprise applications.

Enterprise applications often involve business users that are frequently interacting with business data, e.g., deleting data, updating data, and so on. Some of this data may be manipulated using client-side spreadsheets. However, conventionally, business users had difficulty updating server-side data responsive to changes they made to data in their client-side spreadsheets.

Furthermore, business users of client-side spreadsheets often lacked complete contextual awareness when making entries in client-side spreadsheets. For instance, a business user modifying a given record or field of a worksheet of the spreadsheet may lack information pertaining to other related records, data dimensions, worksheets, and so on, as this information may not be immediately accessible or viewable in the client-side worksheet. Generally, users often lacked direct and immediate access to the relevant context.

This lack of context information would require users to switch views and/or log in to related server-side application(s) to view related information needed to provide appropriate entries in their worksheet. This was inefficient.

SUMMARY

Various embodiments discussed herein employ a spreadsheet add-in to facilitate orchestration and integration between a client-side spreadsheet and complex server-side data models. For instance, server-side data models may exhibit complex hierarchies of data, which may be arranged in different levels of constituent data objects of the hierarchies. The example add-in includes code for mapping and associating or linking client-side spreadsheets (e.g., of a given spreadsheet workbook, i.e., collection of worksheets) in accordance with information about complex server-side data hierarchies.

In various embodiments, the plug-in facilitates integrating and synchronizing client-side spreadsheets with cloud-based data models exhibiting similar and corresponding structures. Embodiments discussed herein provide systems, methods, and User Interface (UI) features to enable users to add data dimensions, e.g., columns of relevant information (i.e., context information) from non-direct ancestor worksheets of a child worksheet to the child worksheet (also called a descendant worksheet herein). The added non-direct ancestor columns help users, e.g., business users, to establish business context when editing descendant rows in a worksheet of a hierarchically structured workbook of the client-side spreadsheet.

An example method facilitates retrieving context information into a worksheet of the client-side spreadsheet, and includes: determining one or more non-direct ancestor data dimensions (e.g., corresponding to columns) of one or more non-direct ancestor worksheets of a descendant worksheet in a hierarchically structured workbook of the spreadsheet; selectively retrieving the one or more non-direct ancestor data dimensions from one or more server-side databases via one or more web services or Application Programming Interfaces (APIs), resulting in one or more retrieved data dimensions; and then displaying the one or more retrieved data dimensions in the descendant worksheet in combination with one or more preexisting data dimensions of the descendant worksheet.

In a more specific embodiment, the one or more retrieved data dimensions and the one or more preexisting data dimensions include or represent one or more columns of data. The spreadsheet is installed on a client system (e.g., smart phone, laptop, desktop computer, etc.) and includes an add-in for communicating with server-side databases via one or more web services. The server-side data is characterized by a data structure that is similar to a structure of the hierarchically structured workbook of the spreadsheet.

The step of selectively retrieving may further include: receiving input in the descendant worksheet specifying a parent worksheet of the descendant worksheet, resulting in received input; then using the received input to retrieve the one or more non-direct ancestor data dimensions from one or more ancestors of the parent worksheet for subsequent display in the descendant worksheet. Note that in certain embodiments, the add-in 18 may implement an Artificial Intelligence (AI) algorithm (or other type of algorithm) that uses metadata (and/or other data) to select and/or propose one or more useful ancestor columns for inclusion in the descendant worksheet. A worksheet developer may then approve such columns, and/or they may be automatically included in the descendant worksheet(s).

The retrieving step may further include accessing a web service that is in communication with a remote server (of the one or more servers) to retrieve data corresponding to the one or more non-direct ancestor worksheets.

The retrieving step may further include using a hierarchy traversal algorithm to determine the one or more columns of the one or more non-direct ancestor worksheets to retrieve for display in the descendant worksheet in accordance with predetermined workbook configuration information.

An example hierarchy traversal algorithm includes using different indices or labels assigned to each worksheet of the spreadsheet workbook to: traverse from the descendant worksheet to the parent worksheet of the descendant worksheet; traverse from the parent worksheet to a first non-direct ancestor worksheet, wherein the first non-direct ancestor worksheet represents a parent of the parent worksheet; retrieve one or more values from the first non-direct ancestor worksheet, wherein the one or more values includes a header of a first non-direct ancestor data dimension, and wherein the first non-direct ancestor data dimension represents a column of the first non-direct ancestor worksheet; and display the one or more values in the descendant worksheet in combination with the first data dimension, wherein the first data dimension represents an editable column of the descendant worksheet.

Accordingly, various embodiments discussed herein help users to clearly identify and update rows in a descendant worksheet, in view of context information retrieved as columns from non-direct ancestor worksheets (e.g., grandparent, great grandparent, etc.) of the descendant worksheet. When downloading data from remote web services, the non-direct ancestor columns added to the descendant worksheet are populated with values fetched from the original non-direct ancestor worksheets as maintained via a server-side database.

A further understanding of the nature and the advantages of particular embodiments disclosed herein may be realized by reference of the remaining portions of the specification and the attached drawings.

BRIEF DESCRIPTION OF THE DRAWINGS

FIG. 5 illustrates a second example UI display screen listing selectable ancestor fields pertaining to columns (i.e., data dimensions) for inclusion as non-direct ancestor columns in the client-side descendant worksheet of FIGS. 1-2.

DETAILED DESCRIPTION OF EMBODIMENTS

Figure 1:
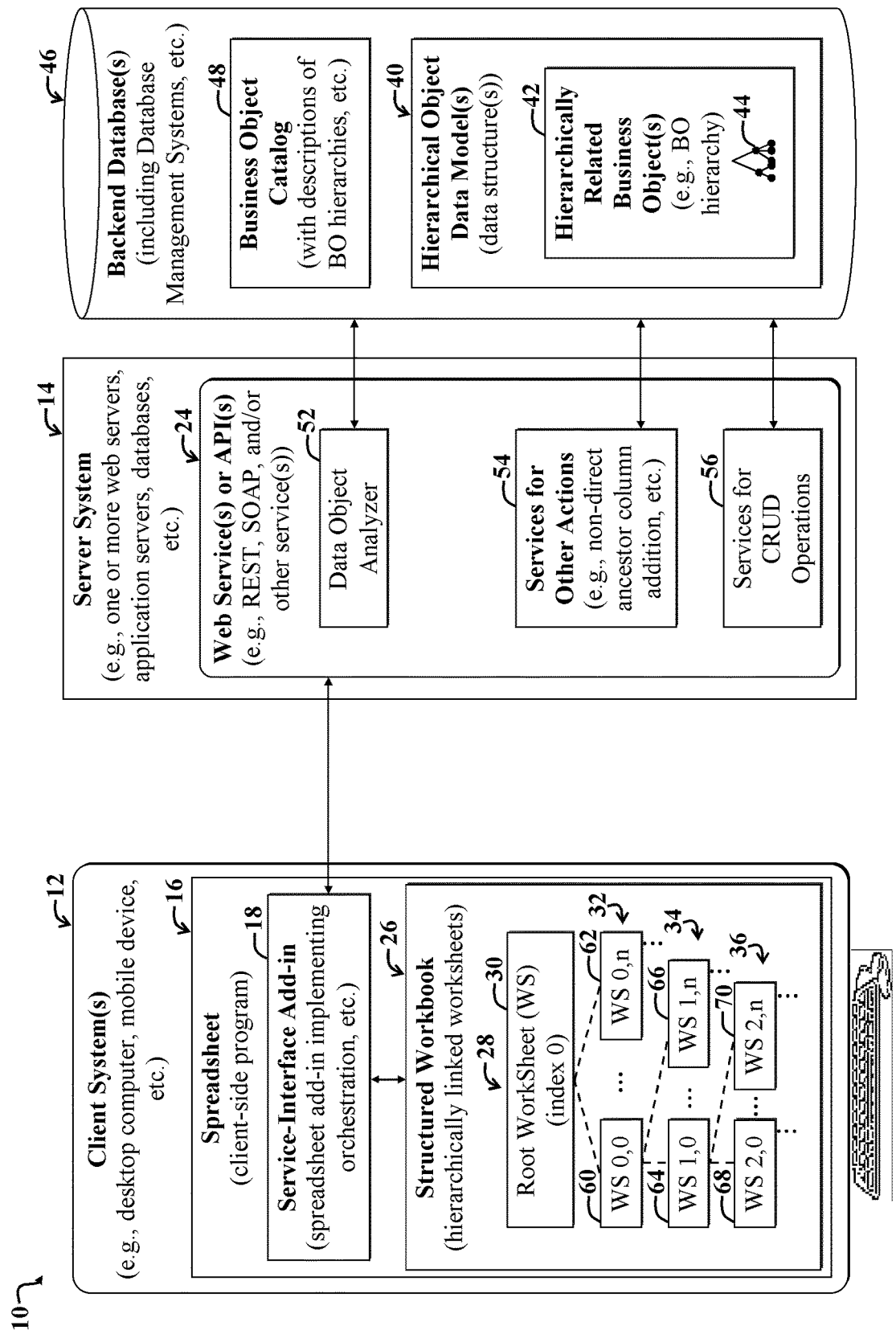
FIG. 1 illustrates a first example system and accompanying computing environment employing a client-side spreadsheet add-in for interacting with web services to facilitate spreadsheet operations, e.g., operations to add non-direct ancestor worksheet columns to a client-side descendant worksheet, thereby enhancing user contextual awareness when viewing and/or modifying editable columns of the client-side descendant worksheet.

When operating on a client-side spreadsheet implementing a hierarchically structured collection of worksheets, users may be unaware how certain columns, rows, and/or fields relate to parent, grandparent, great grandparent worksheets, and so on, characterizing server-side parent data models describing the ancestor spreadsheets. This lack of context information inhibited informed decision making. Various embodiments discussed herein remove obstacles to accurately and efficiently editing worksheet rows that were caused by lack of non-direct ancestor column values.

To accurately and efficiently edit rows in a child spreadsheet of a layouts hierarchy that is to be synchronized with a server-side data model, users may require values from grandparent, great grandparent and even further ancestor worksheets to help identify and understand rows in descendant worksheets. The terms "layout" and "worksheet" may be employed interchangeably herein.

For the purposes of the present discussion a child worksheet, object, or node may be any second-level or lower level worksheet, object, or node, i.e., at a lower level in the accompanying hierarchy than a root (i.e., top level) worksheet, object, or node. The terms "child" and "descendant" may be employed interchangeably herein. Nevertheless, the term "child" is primarily used herein when discussing it in relation to the child's direct parent worksheet, object, or node.

Relative to a child worksheet, an ancestor worksheet or layout may be any worksheet that can be reached from the child worksheet by proceeding, one or more times, from child to successive parent. For instance, a parent, grandparent, great grandparent, or higher level worksheet of a child worksheet is called an ancestor of the child worksheet. The child worksheet is also called a descendant worksheet.

A non-direct ancestor of the child worksheet may be any ancestor of the worksheet other than its direct parent worksheet. For instance, a grandparent, great grandparent, or higher level (higher in the associated workbook hierarchy) of a descendant worksheet is a non-direct ancestor of the descendant worksheet.

For the purposes of the present discussion, a spreadsheet may be any software application, such as Microsoft Excel®, or other spreadsheet, for facilitating organization and use of data via tables. Depending upon the context in which the term is used, a spreadsheet may also refer to a document produced by the software application, or may refer to a table shown in a UI display screen of the software application. Alternatively, the term worksheet (also called layout herein) may refer to particular tables or sections of a spreadsheet UI. A workbook may refer to a collection of one or more worksheets. Generally, workbooks discussed herein exhibit hierarchical structures, i.e., the worksheets are part of a hierarchy of worksheets.

Client-side spreadsheets often use workbooks, which may include a set of hierarchically related worksheets (often called "dependent layouts hierarchies"), where the structure of the hierarchy may conform to a data model, as discussed more thoroughly in the above-identified and incorporated US Patent Application, entitled ORCHESTRATION OF CRUD OPERATIONS FOR A HIERARCHICAL WEB SERVICE DATA MODEL IN A SPREADSHEET.

A hierarchy may be any ordering of or arrangement of data, where different data in the arrangement may exhibit superior or subordinate relationships with other data. A hierarchy may refer to a displayed representation of data objects and/or may refer to data and accompanying relationships existing irrespective of the displayed representation.

Hierarchical relations may be direct or "immediate", i.e. where the hierarchical levels of two data items (e.g., hierarchically related worksheets) differ by one (1). In such a case, the data item with the higher hierarchical level may be called the "parent" or "immediate ancestor" and the data item with the lower hierarchical level may be called the "child" or "immediate descendant." Hierarchical relations may be "remote", i.e. where the hierarchical levels of two data items differ by two (2) or more. In such a case, the data item with the higher hierarchical level may be called the "remote ancestor" (such as a "grandparent") and the data item with the lower hierarchical level may be called the "remote descendant" (such as a "grandchild"). Remote ancestors are also called "non-direct ancestors" herein. Data items on the same hierarchical level may be called "hierarchical peers" or "siblings."

For the purposes of the present discussion, a tree (also called a tree structure) may be any data structure characterized by one or more hierarchies. A tree hierarchy may be a hierarchy characterized by a group of related nodes, such as attributes, dimensions, labels, data objects, worksheets, etc., which may be arranged in levels, where higher levels are characterized by nodes that exhibit superior relationships relative to nodes of lower levels. Higher level nodes are called parents, grandparents, etc., of related lower level nodes, e.g., child nodes, grandchild nodes, and so on.

A tree hierarchy, also called tree structure herein, may exhibit nodes corresponding to data dimensions and/or leaf data. Leaf data may represent data of the lowest level node (called a leaf node) along any branch of the tree structure, such that the leaf node lacks any child nodes.

Tree hierarchies, also called data hierarchies herein, may be categorized as explicit and/or implicit hierarchies. Explicit hierarchical representations of data are organized according to hierarchical relationships inherent within the data. Such hierarchical relationships are often based on persistent data attributes characterizing the data. An example of an explicit hierarchy (also called extrinsic hierarchy herein) includes information about cities arranged by country, state, county, and so on. Another example may be a human resources hierarchy, which depicts a corporate structure, where employees are subordinate to project managers, which are subordinate to regional directors, and so on. In general, explicit hierarchies are defined and maintained irrespective of the visualization technique used to display the data.

For the purposes of the present discussion, an implicit hierarchical representation, i.e., implicit hierarchy, may refer to an organization of data and relationships that is user instantiated by choices made to display and/or analyze the data. Hence, certain implicit hierarchies may be implied from the way that users classify and summarize detailed amounts or metrics by different data dimensions on reports and analytics. Each level of an implicit hierarchy may correspond to a data dimension displayed in a report or analytic. A data dimension may be any category or classification of an amount or category. For example, columns of a table may represent data dimensions.

Various embodiments discussed herein employ a spreadsheet add-in to facilitate orchestration and integration between a client-side spreadsheet and complex server-side data models. For instance, server-side data models may exhibit complex hierarchies of data, which may be arranged in different levels of constituent data objects of the hierarchies. The example add-in includes code for mapping and associating or relating client-side spreadsheets (e.g., of a given spreadsheet workbook, i.e., collection of worksheets) in accordance with information about complex server-side data hierarchies.

For the purposes of the present discussion, an object, such as a data object, may be any grouping of or encapsulation of data and/or functionality. Examples of objects include classes or structures implemented via object-oriented programming languages; tables, rows, or records of a database; and so on.

Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment.

A business object may be any object used to organize information for business purposes. Data that is associated with a business object may be contained within a data structure or database associated with the object, or the information may be distributed among different applications, computers, and so on, without departing from the scope of the present teachings.

A data model may be any structure (e.g., data structure) or format characterizing an organization of data. The data may be organized in data objects, where certain relationships may occur between the data objects. These relationships may be considered part of the data model. A data model may further include a description of the objects, where the description specifies a collection of concepts and rules used in defining the structure of the data model. For example, a certain data model may employ relations and tuples between database records and fields. Data models are often specified graphically, e.g., using data modeling notation.

Note that, when business users, e.g., enterprise personnel, edit their business data with a spreadsheet (e.g., Microsoft Excel®), that is integrated with a remote data service, they may appreciate the ability to perform CRUD (Create, Read, Update, Delete) operations against a hierarchy of business objects, especially when they have more efficient access to relevant context information, e.g., information contained in non-direct ancestor columns added to a descendant worksheet being edited, as discussed more fully below.

For example, accounting users may use a spreadsheet to work on data of an Expense Reports business object. The Expense Reports business object may have sub-objects, e.g., child objects, grandchild objects, and so on.

For example, an Expense Reports object may have a set of individual Expenses objects as child objects (i.e., also called children). The Expenses object may have one or more Itemizations object(s) as children. The Itemizations object may have an Expense Item Documents as a child. The business user may wish to naturally and efficiently act on all data in the server-side data hierarchy using their client-side spreadsheet program.

Conventionally, in theory, a business user could manage several spreadsheets, and copy and paste data relationship keys between them. The business user, e.g., manager, accountant, etc., might then perform multiple queries, multiple downloads, and copy/paste the resultant rows into a temporary sheet for analysis before completing changes, updates, etc.

Generally, the need to manually manage data relationship key values, perform multiple queries, and so on, is error prone, inefficient, and time consuming, especially when working with many potentially large spreadsheets. Accordingly, for manageability, business users often limit standard editing operations to one or two resources (e.g., corresponding to rows or groups of rows) on a single spreadsheet or worksheet.

Various embodiments discussed herein overcome such inefficiencies by facilitating orchestration between client-side spreadsheets and server-side data models using a client-side spreadsheet add-in, and further facilitate enhancing user situational awareness by facilitating the addition of non-direct ancestor columns to a worksheet, as discussed more fully below.

Generally, software developers, configuration managers, deployment managers, and other users of a computing environment may subscribe to certain cloud services to facilitate development, configuration, and deployment of software applications and storage of associated files.

For the purposes of the present discussion, a server may be any computing resource, such as a computer and/or software that is adapted to provide content, e.g., data and/or functionality, to another computing resource or entity that requests it, i.e., the client. A client may be any computer or system, including software system that is adapted to receive content from another computer or system, called a server. A server system may be any collection of one or more servers and accompanying computing resources. The terms "client device" and "client" may be employed interchangeably herein, however, depending upon the context in which the term is used, the term client may refer more generally to both client devices and client software.

A computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

For the purposes of the present discussion, a software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

A web service may be any computer code and associated functionality that is adapted to be called by an application or other service or process whose code is stored in a separate location (e.g., on another computer or memory storage location or device) from the web service. Accordingly, the term "service" as used herein is relatively broad and may include remotely accessible APIs and services characterized by Web Services Description Language (WSDL) interfaces, Simple Object Access Protocol (SOAP), REpresentational State Transfer (REST), YAML (Yet Another Markup Language), and/or other types of interfaces.

Generally, web services, also simply called services herein, provide functionality, e.g., capabilities, that may be reused by different applications, processes, or web services (that may be distributed across a network), which access the functionality via a service interface (e.g., WSDL interface) consistent with a description of the web service. A web services model may represent a loosely coupled integration model for allowing flexible integration of various network-distributed applications or processes.

Certain embodiments discussed herein generally relate to systems and methods for using software (called client-side software herein) running on a desktop computer, mobile device, or other computer system to authenticate with and access data, update, or otherwise use any functionality provided by web services, e.g., REpresentational State Transfer (REST) services or Application Programming Interfaces (APIs).

Although reference may be made to specific types of spreadsheet programs, e.g., Microsoft Excel, Google Sheets, Open Office, etc., it should be apparent that features of the embodiments can be adapted for use with any suitable spreadsheet program.

Software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

For clarity, certain well-known components, such as the Internet, hard drives, processors, power supplies, routers, Internet Service Providers (ISPs), orchestration modules, data object analyzers, business process management systems, database management systems, middleware, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing a client-side spreadsheet add-in 18 for interacting with web services 24 to facilitate spreadsheet operations, e.g., operations to add non-direct ancestor worksheet columns (e.g., columns of worksheets 30 and 60) to a client-side descendant worksheet, such as worksheet 68, thereby enhancing user contextual awareness when viewing and/or modifying editable columns of the client-side descendant worksheet 68.

The spreadsheet operations are performed using multi-dimensional hierarchically structured server-side data (e.g., corresponding to a hierarchical object data model 40) and similarly structured multi-dimensional hierarchically related arrangement of worksheets (e.g., corresponding to a hierarchy of worksheets 28) of a structured workbook 26.

The first example system 10 includes one or more client systems 12 (e.g., desktop computer, mobile device, etc.) in communication with a server system 14 via a network, such as the Internet. The server system 14 communicates with one or more backend databases 46. The server system 14 runs one or more web services or APIs 24, which facilitate interaction between the one or more client systems 12 and data and functionality maintained or provided via the backend databases 46.

The example client system(s) 12 includes a spreadsheet 16 (also called the client-side spreadsheet) with a service-interface add-in 18 and hierarchically structured workbook 26.

The example web services 24 (also called cloud-based services) of the server system 14 include a data object analyzer 52, one or more services for facilitating implementing other actions (e.g., adding non-direct ancestor columns to a descendant worksheet) 54, and one or more services 56 for facilitating implementing CRUD (Create, Read, Update, Delete) operations.

The example backend databases 46 include a business object catalog 48 and one or more hierarchical object data models (also called data structures herein).

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, while the backend databases 46 are shown separately from the server system 14, the backend databases 46 may be part of the server system 14, without departing from the scope of the present teachings.

For instance, while the business object catalog 48 and hierarchical object models 40 may be implemented by a relational database that is used for persistence of the hierarchical object data models 40 and accompanying data, other embodiments are possible. For instance the business object catalog 48 hierarchical object data models 40 may be implemented in the server system 14, e.g., via one or more web services and/or APIs 24, and/or other module in communication therewith.

For example, a separate box (i.e., separate from the web services or APIs 24) may represent a module that incorporates functionality for communicating with, managing, and/or exposing the business object catalog 48 and accompanying hierarchical object data models 40 to the one or more client systems 12. The backend database(s) 46 may influence the hierarchy, but, alternatively, may be used only for storage of data. Accordingly, in this example case, the business object data models 40 and accompanying hierarchies 44 can be implemented, in whole or in part, via one or more modules running on the server system 14.

In the present example embodiment, the backend databases 46 include business objects 42 that are hierarchically related in accordance with the hierarchical object data model 40; graphically depicted here via a data hierarchy 44. For instance, a given parent object may have one or more child objects (called children), and the children may also have one or more child objects, and so on, as discussed more fully below.

The client-side structured workbook 26 of the spreadsheet 16 has been configured with an example client-side hierarchy 28 of worksheets, including a parent Work Sheet (WS)

30, a first set of sibling child worksheets 60-62 on a second level 32 of the hierarchy 28, a second set of sibling grandchild worksheets 64-66 on a third level 34 of the hierarchy 28, and a third set of sibling great grandchild worksheets 68-70 at a fourth level 36 of the hierarchy 28.

Note that the great grandchild worksheets 68-70 are also called child worksheets of the associated parent worksheets 64-66 at the third level 34 of the hierarchy 28. Similarly, the worksheets 64-66 are child worksheets of the worksheets 60-62 at the second level 32 of the hierarchy 28. The worksheets 60-62 are child worksheets of the root (also called top-level) worksheet 30. The worksheets 68-70 are called descendant worksheets of the worksheets 30, 60-66 and leaf nodes of the hierarchy 28. The worksheets 30, 60-62 represent non-direct ancestor worksheets of the worksheets 68-70.

In an example embodiment, the top-level worksheet 30 may represent, for instance, an Expense Reports worksheet; the second level 32 worksheets 60-62 may represent one or more Expenses worksheet(s). The third level 34 worksheets 64-66 may represent one or more Expense Itemizations worksheets. The fourth level 36 worksheets 68-70 may represent one or more Expense Item Documents worksheets, as discussed more fully below with reference to FIG. 3.

In the example embodiment, one or more columns from the root worksheet 30 and the second level 32 worksheets 60-62 may be incorporated into one or more of the fourth-level 36 worksheets 68-70. Data for the columns may be retrieved (for display in the worksheets 68-70) from the backend databases 46, e.g., via use of the service-interface add-in 18 in communication with the hierarchically related business objects 42 via the web services and/or APIs 24 (e.g., via the services for other actions 54), as discussed more fully below.

Note that associations, relations, or links between the worksheets 30, 60-70 and construction of the worksheets 30, 60-70 can be automatic and/or manual. During automatic configuration, the service-interface add-in 18 obtains or accesses information about the server-side hierarchical object data model 40 and accompanying business objects 42 and hierarchical relationship structure 44 (also called server-side hierarchy herein). Note that in certain embodiments, the add-in 18 may implement an Artificial Intelligence (AI) algorithm (or other type of algorithm) that uses metadata (and/or other data) to select and/or propose one or more ancestor columns for inclusion in the descendant worksheet The service-interface add-in 18 may obtain this descriptive information describing the server-side hierarchy 44 and associated business object model 40 responsive to one or more request messages sent by the service-interface add-in 18 to the data object analyzer 52.

The data object analyzer 52 may be a service that selectively accesses a business object catalog 48, which contains descriptive information, e.g., descriptions of business object hierarchies 42 and data models 40, of the backend databases 46. The descriptive information can include relationship keys describing, for instance, how each of the hierarchically related business objects 42 are related to each other (e.g., parent object, child object, sibling object, grandchild object, and so on).

The data object analyzer 52 then delivers a response message with the descriptive information to the service-interface add-in 18 responsive to the request message issued therefrom. The service-interface add-in 18 includes code for automatically constructing the structured workbook 26 and generating the initial worksheets 30, 60-70.

The worksheets 30, 60-70 are then related to each other so that the worksheet hierarchy 28 models a portion of, e.g., a subset of, (or all of, depending upon a given implementation) the server-side hierarchy 44. Hence, the structure of the worksheet hierarchy 28 (also called client-side hierarchy herein) matches a portion of the structure 42 that includes data objects with data corresponding to data of the worksheets 30, 60-70 at similar levels of the data structure 40.

Note that the service-interface add-in 18 may include computer code for controlling certain UI functionality of the spreadsheet 16. For instance, during manual structuring of relationships among the worksheets 30-36, a user may access one or more menus for selecting parent worksheets for given worksheets, and so on.

The service-interface add-in 18 may control the availability of certain user options in such menus. For instance, the service-interface add-in 18 may reference knowledge of the server-side hierarchy 44 to ensure that inappropriate relationships between the worksheets 30-36 are not established, i.e., menu options for such are not provided during a manual configuration mode.

Structuring relationships between the worksheets 30, 60-70 in accordance with the server-side hierarchy 44, which characterizes the hierarchically related business objects 42 of the hierarchical object data model 40, facilitates consistent interaction, synchronization, orchestration, including CRUD operations and the addition of non-direct ancestor columns and associated data to descendant worksheets (e.g., fourth level 36 worksheets 68-70), which can now readily be implemented across complex data object hierarchies 44 via a user-friendly UI of the spreadsheet 16, as discussed more fully below.

Figure 2:
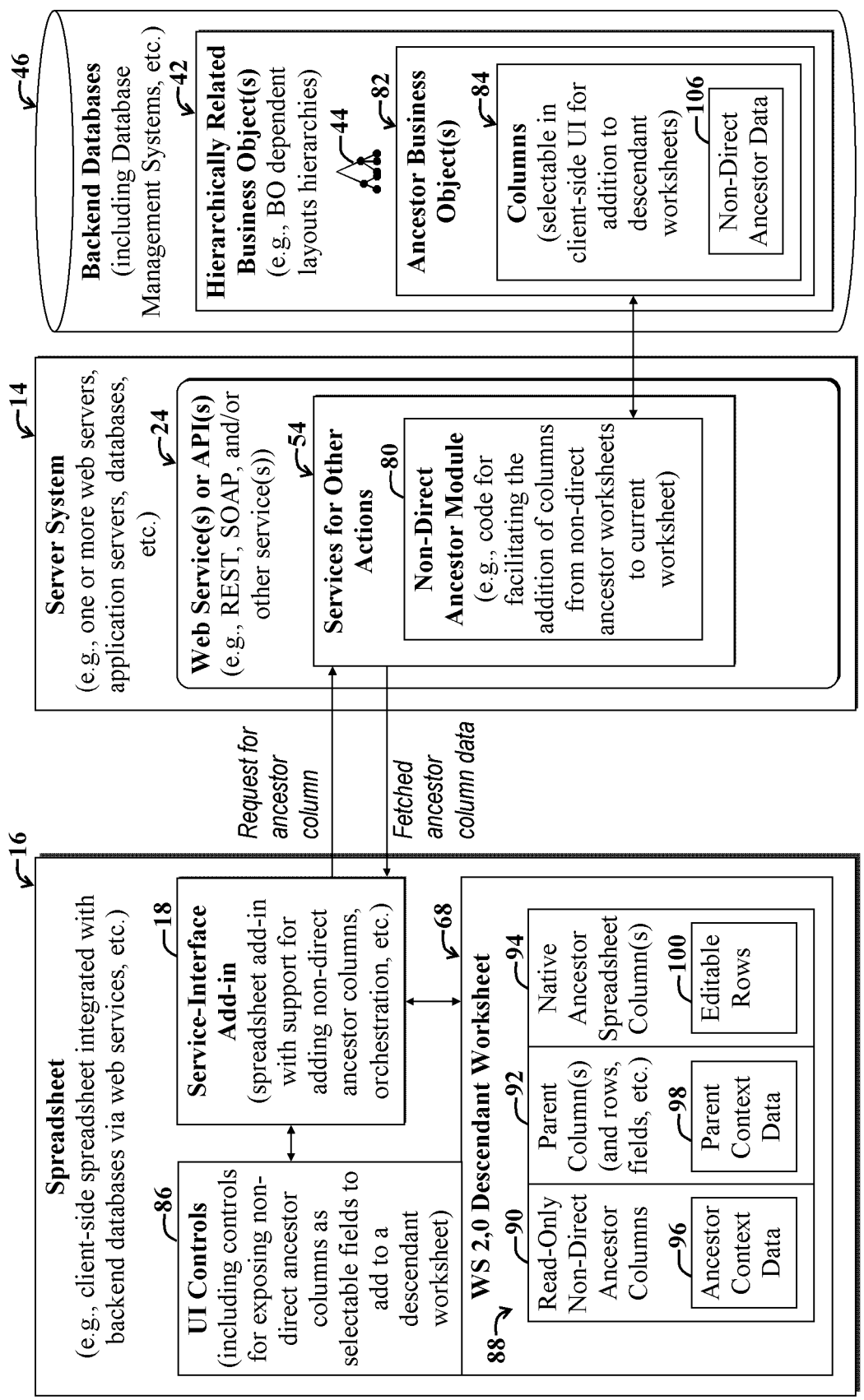
FIG. 2 illustrates additional detail and modules of the first example system of FIG. 1 for adding non-direct ancestor columns to the client-side descendant worksheet thereof.

FIG. 2 illustrates additional detail and modules or features 80-88 of the first example system 10 of FIG. 1 for adding non-direct ancestor columns 90 to the client-side descendant worksheet 68 thereof.

The services for other actions 54 among the web services and/or APIs 24 further shows a non-direct ancestor module 80, with code for facilitating the addition of columns 90 and associated data 96 from non-direct ancestor worksheets (e.g., worksheets 30, 60, 62 of FIG. 1) to the current worksheet 68, i.e., the descendant worksheet 68. Note that the service-interface add-in module 18 may also include code for implementing hierarchy traversal algorithms, worksheet construction, and so on, which can also facilitate the selective addition of the non-direct ancestor columns 90 to the example descendant worksheet 68. Note that worksheet construction can include manual steps as discussed herein (e.g., configuration and/or updating steps) and/or steps may be fully automatic, depending upon the needs of a given implementation.

The spreadsheet 16 further shows a set of User Interface (UI) controls 86 which are displayed in the same UI display screen as the first descendant worksheet 68 and provide user options for manipulating and interacting with the descendant worksheet 68. The UI controls 86 include mechanisms (and associated user options) to access one or more dialog boxes whereby a user may configure the spreadsheet 16 and associated hierarchy 28 and descendant worksheet 68 of FIG. 1 to enable a user to select columns from non-direct ancestor worksheets (e.g., worksheets 30, 60-62) of FIG. 1 for inclusion in the descendant worksheet 68.

Once a user has selected non-direct ancestor columns 90 for inclusion in the spreadsheet 68, the user may then download data for the columns from the backend database(s) 46, e.g., via use of one of the UI controls 86. Once the user has selected to download the data, a signal (e.g., request message) is sent to the non-direct ancestor module 80 of the web services or APIs 24 via the service-interface add-in 18. The non-direct ancestor module 80 then communicates with the backend database(s) to access the ancestor business object(s) 82 (including non-direct ancestor business objects for that worksheet) to retrieve accompanying non-direct ancestor data 106 of non-direct ancestor business object columns 84 for inclusion as the client-side descendant context data 96 for the non-direct ancestor columns 90 of the descendant worksheet 68.

Note that the descendant worksheet 68 may already display native (also called "regular" herein) spreadsheet columns 94 and associated editable rows of data 100 in combination with one or more parent columns 92 and associated parent context data 98.

Note that the retrieved ancestor context data 96 and the parent context data 98 may include data that helps the user to make more informed decisions (i.e., in view of the data 96, 98) when editing the editable rows 100, adding new rows, deleting rows, and so on; hence the term "context information." The terms "context data" and "context information" may be employed interchangeably herein.

When a user configures the descendant worksheet 68 to include non-direct ancestor columns, a listing of selectable non-direct ancestor columns may be exposed as selectable fields among the UI controls 86 and/or associated dialog boxes. In the present specific example embodiment, to add non-direct ancestor columns to the descendant worksheet 68, the parent column(s) 92 would have one or more valid values, which the service-interface add-in 18 can then use to link the descendant worksheet 68 with its ancestors, as discussed more fully below with reference to FIGS. 15-17.

Note that in the present example embodiment, the parent column(s) 92 and non-direct ancestor columns 90 are read-only, i.e., not editable directly from the descendant worksheet 68. In certain use cases, this read-only feature of the non-direct ancestor columns 90 may help to prevent inadvertent data corruption in the broader hierarchy of the accompanying structured workbook 26 of FIG. 1. Nevertheless, embodiments are not limited to the use of read-only non-direct ancestor columns.

Figure 3:
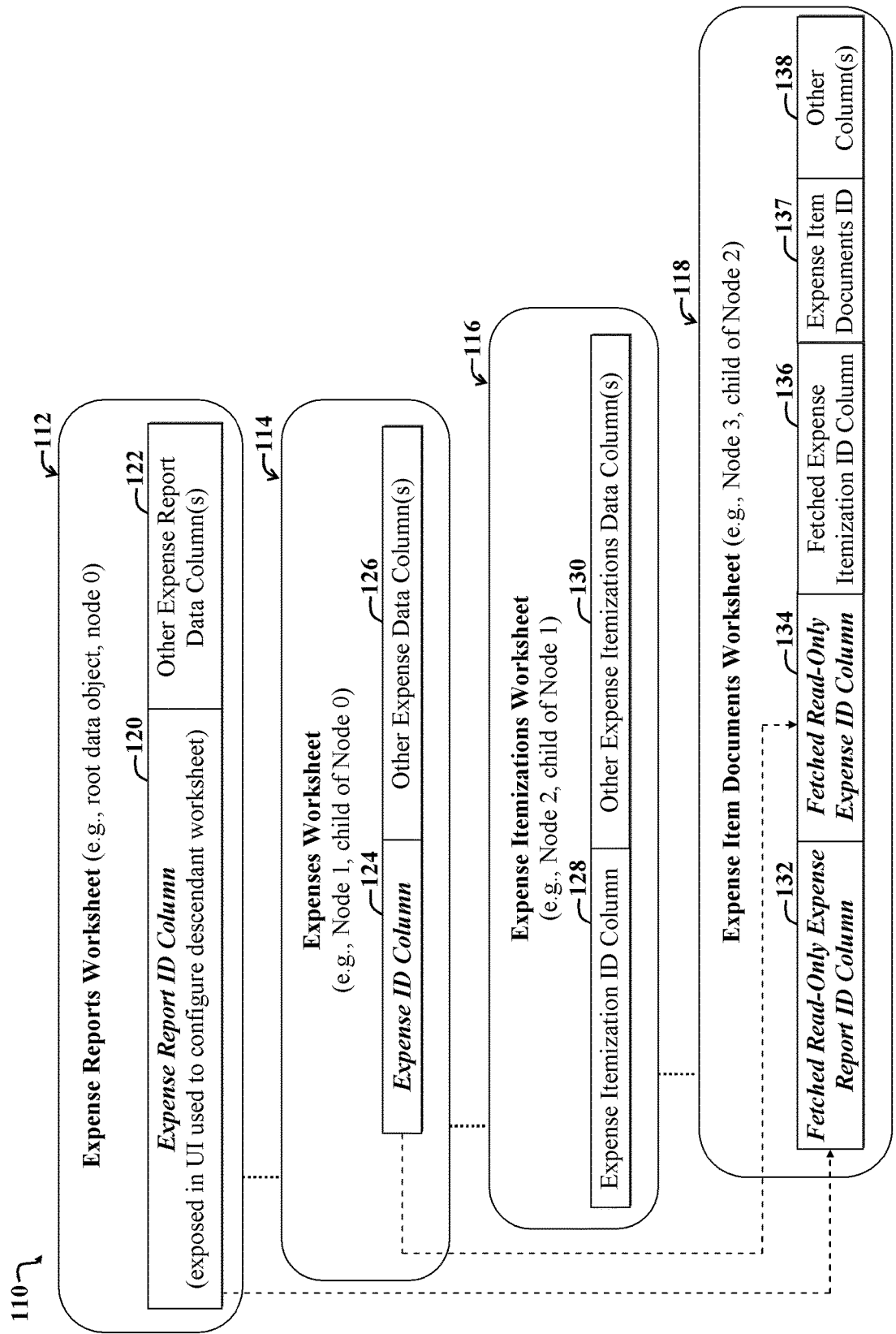
FIG. 3 illustrates an example data hierarchy characterizing an example arrangement of server-side business objects of a server-side data structure (also called data model herein) and a corresponding worksheet hierarchy, i.e., arrangement of related client-side worksheets of a spreadsheet program.

FIG. 3 illustrates an example data hierarchy, i.e., worksheet hierarchy 110, also called a structured workbook hierarchy (where each worksheet of the hierarchically structured workbook has a corresponding server-side data object), characterizing an example arrangement of server-side business objects 112-118 of a server-side data structure (also called data model herein, e.g., corresponding to the hierarchy 44 of FIGS. 1 and 2) and a corresponding worksheet hierarchy, i.e., arrangement of related client-side worksheets (e.g., corresponding to a version of the workbook hierarchy 28 of FIG. 1) of a spreadsheet program (e.g., the spreadsheet 16 of FIGS. 1 and 2).

The example worksheet hierarchy 110 includes a top-level Expense Reports worksheet 112, which may correspond to (or represent an example of) the root worksheet 30 of the workbook hierarchy 28 of FIG. 1. The Expense Reports worksheet 112 may include several columns of data 120, 122, which may include additional data, such as workbook Reporter, Purpose, Status, Final Approval Date, and so on.

For illustrative purposes, the Expense Reports worksheet 112 is shown including an Expense Report IDentification (ID) column 120 and one or more additional columns listing additional expense report information 122 corresponding to each Expense Report ID entry in the Expense Report ID column 120. Note that the Expense Reports worksheet 112 may be include a table, where each row of the table has an entry in the Expense Report ID column 120 and entries for other columns, e.g., Purpose, Status, etc., i.e., other expense report data 122.

An Expenses worksheet 114 is a child of the Expense Reports worksheet 112. The example Expenses worksheet 114 includes, in part, an Expense ID column 124 and one or more columns listing additional expense information 126 for each entry in the Expense ID column 124.

An Expense Itemizations worksheet 116 is a child of the Expenses worksheet 114. The Expense Itemizations worksheet 116 includes, in part, an Expense Itemization ID column 128 and one or more additional columns 130 with information about each expense itemization identified in the Expense ID column 124.

An Expense Item Documents worksheet 118 is a child of the Expense Itemizations worksheet 116 and represents a descendant worksheet of the worksheets 112-116. The Expense Reports worksheet 112 and the Expenses worksheet 114 represent non-direct ancestors of the descendant worksheet 118.

The Expense Item Documents worksheet 118 includes one or more columns 132-138 with information about documents associated with itemizations for expenses, e.g., corresponding to an Expense Itemization ID column 128, 136 and an Expense ID column 134, which correspond to one or more Expense Report(s) (e.g., corresponding to the Expense Reports worksheet 112 and associated fetched Expense Report ID column 132 entries). Note that the Expense Item Documents worksheet 118 may include a table, where each row of the table describes an Itemization Document, such that the table represents a list of documents associated with a single parent Expense Itemization, i.e., corresponding to a row of a table of the Expense Itemizations worksheet 116.

Note that in FIG. 3, a fetched Expense Report ID column 132 and a fetched Expense ID column 134 represent non-direct ancestor columns fetched from the Expense Reports worksheet 112 and the Expenses worksheet 114, respectively, via the embodiments of FIGS. 1 and 2.

Note that the fetched Expense Itemization ID Column 136 corresponds to the similarly-named Expense Itemizations ID Column 128 of the Expense Itemizations worksheet 116.

Depending upon the needs of a given implementation, the Expense Itemization ID Column 136 may or may not be read-only. Nevertheless, valid data from the Expense Itemizations worksheet 116 should appear in the Expense Item Documents worksheet 118 (e.g., as the fetched Expense Itemization ID column 136) to facilitate linking the Expense Item Documents worksheet 118 with the other ancestors 112-114. The linking facilitates retrieval of the non-direct ancestor columns 132, 134 and accompanying data, e.g., from the backend database(s) 46 of FIGS. 1 and 2, as discussed more fully below.

An Expense Item Documents ID 137 column identifies an expense item associated with a corresponding document further described via one or more other columns 138.

In summary, the Expense Reports worksheet 12 represents a top-level resource that contains the list of Expense Reports 122. Each Expense Report may include additional information, such as reporter and final approval date. The Expenses worksheet 114 is a child resource of the Expense Reports worksheet 112. The Expense Itemizations worksheet 116 is a child resource of the Expenses worksheet 114. The Expenses worksheet 114 is the grandparent of the Expense Itemizations worksheet 116. The Expenses worksheet 114 is a grandparent of the Expense Item Documents worksheet 118.

The user sought to add the Expense Report ID column 120 of the Expense Reports worksheet 112 and the Expense ID column 124 from the Expenses worksheet 114 to the Expense Item Documents worksheet 18 via the systems of FIGS. 1 and 2, which then appear as the fetched read-only Expense Report ID column 132 and the fetched read-only Expense ID column 134 in the descendant worksheet 118.

Figure 4:
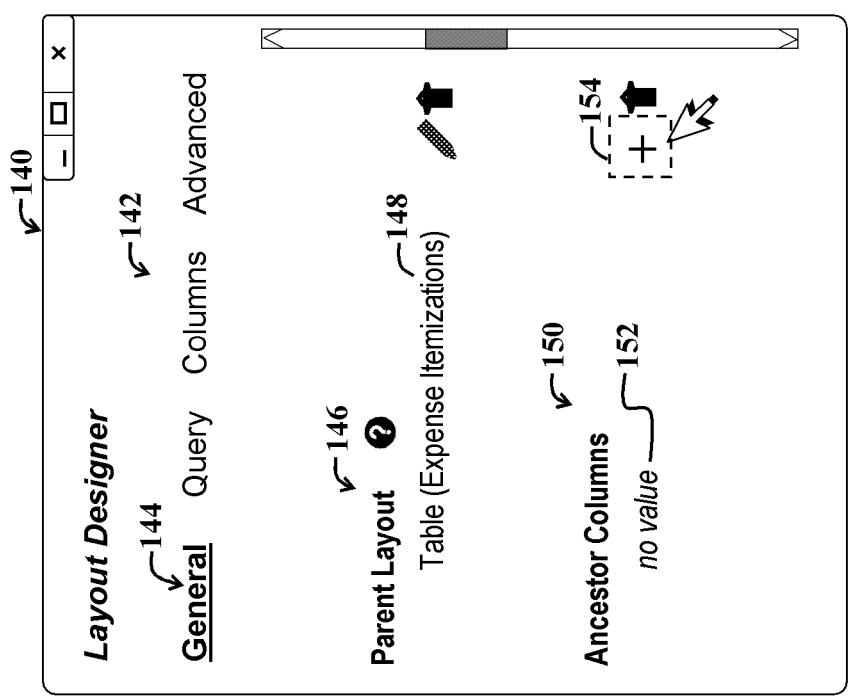
FIG. 4 illustrates a first example User Interface (UI) display screen for configuring the spreadsheet and accompanying add-in of FIG. 1 for adding non-direct ancestor columns to the client-side descendant worksheet of FIGS. 1-2.

FIG. 4 illustrates a first example User Interface (UI) display screen 140 for configuring the spreadsheet and accompanying add-in of FIG. 1 for adding non-direct ancestor columns to the client-side descendant worksheet 68 of FIGS. 1-2 and 118 of FIG. 3.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

With reference to FIGS. 2 and 4, the UI controls 86 of FIG. 2 include a control for accessing the first UI display screen 140, which represents a first Layout Designer dialog box (if it is not already displayed in the descendant worksheet 68 being edited by a user). The first Layout Designer 140 dialog box includes various UI controls and tabs 142, where currently a General tab 144 is selected.

The example General tab 144 currently shows a Parent Layout section 146, indicating that the parent table or worksheet (or layout) is an Expense Itemizations worksheet. This is shown by an indicator in an Expense Itemizations field 148. Note that an option to remove the parent Expense Itemizations worksheet as part of the present descendant layout is also provided. However, also note that various embodiments discussed herein may use the information in the Parent Layout section 146 to link an underlying descendant spreadsheet with ancestor worksheets, including non-direct ancestor worksheets.

An Ancestor Columns section 150 includes an Ancestor Columns indicator 152 showing "no value," indicating that no ancestor columns have been associated with or directly linked to the present descendant worksheet or have otherwise been removed.

User selection of an ancestor-column adding button 154 results in subsequent display of a second UI display screen, whereby a user may select ancestor worksheets, including non-direct ancestor worksheets, and associated columns for inclusion in the present descendant worksheet, as discussed more fully below with reference to FIG. 5.

FIG. 5 illustrates a second example UI display screen 160 listing user selectable ancestor fields 162 (i.e., rows) pertaining to columns (i.e., data dimensions) for inclusion as ancestor columns, including non-direct ancestor columns (e.g., columns 120 and 124 of FIG. 3) in the client-side descendant worksheet of FIGS. 1-2 (e.g., corresponding to columns 132 and 134 of FIG. 3).

In the second example UI display screen 160 a user has selected an Expense Report ID row 164, an Expense ID row 166, and an Expense ID row 168, which identify columns of ancestor worksheets (e.g., worksheets 112-116 of FIG. 3), including columns of non-direct ancestor worksheets (e.g., worksheets 112, 114 of FIG. 3).

In summary, a user picks one or more ancestor fields from among the user-selectable fields 162 of the second example UI display screen 160. This UI display screen 160 lists all ancestor fields that have been added as columns in the ancestor tables (also called ancestor worksheets). Note that, in the present specific example embodiment, if a field is not exposed as a column in an ancestor table (also called ancestor worksheet), it will not show in this list 162 when accessing the list 162 from the descendant worksheets (also called layouts herein). Ancestor columns configured in ancestor tables (i.e., worksheets) will not be included among lists of descendant tables of an ancestor's field list either. Nevertheless, note that embodiments are not limited to these restrictions. For instance, note that in other embodiments, inclusion of ancestor columns in descendant worksheets may be automatically inferred (e.g., by an AI algorithm based on metadata, etc.), configured, and included in descendant worksheets.

Figure 6:
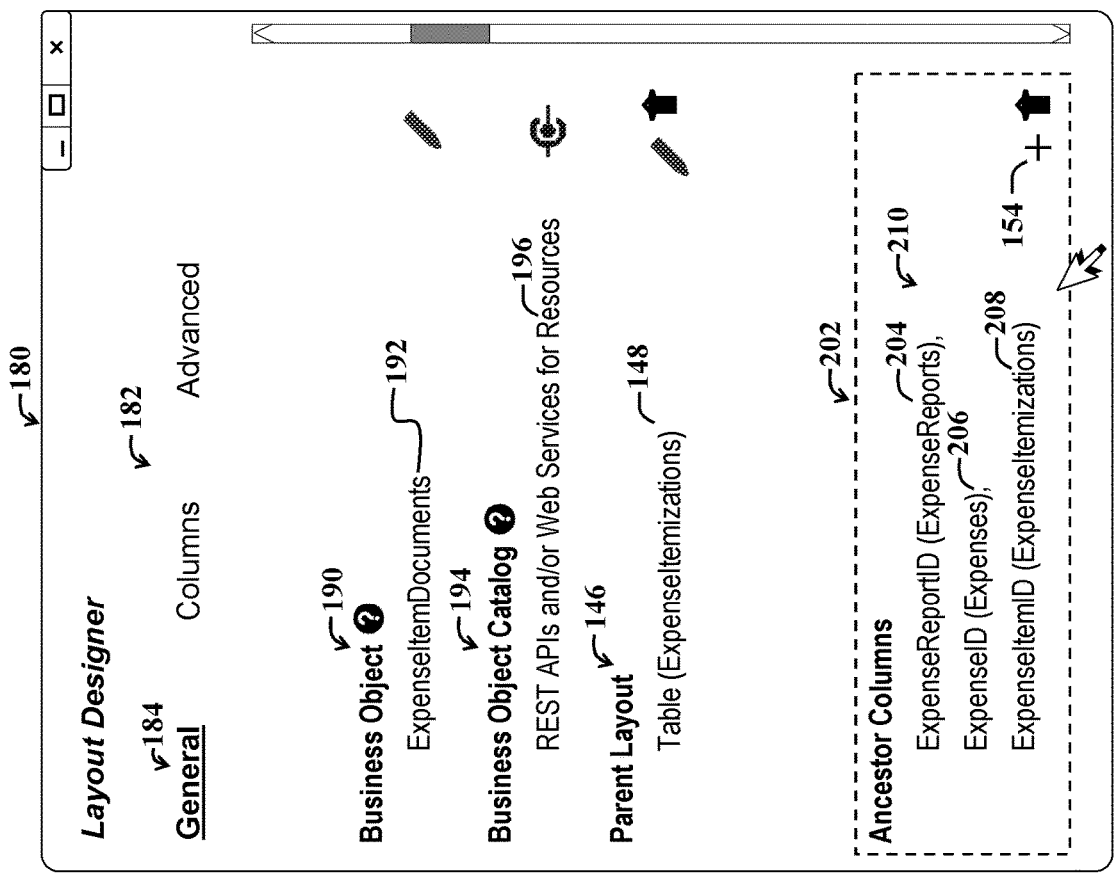
FIG. 6 illustrates a third example UI display screen, showing that ancestor columns (selected via the second example UI display screen of FIG. 5) have been added to an ancestor columns list of the client-side descendant worksheet of FIGS. 1-2.

FIG. 6 illustrates a third example UI display screen 180, showing that ancestor columns (selected via the second example UI display screen of FIG. 5) have been added to an Ancestor Columns list 210 of the client-side descendant worksheet 68 of FIGS. 1-2.

The third example UI display screen 180 represents an updated version of the Layout Designer 140 of FIG. 4. An updated Ancestor Columns section 202 includes an Ancestor Columns listing 210 that identifies an Expense Report ID ancestor column (or data dimension) 204, an Expense ID ancestor column 206, and an Expense Itemizations ID column 208.

The updated Layout Designer 180 includes various additional UI controls 182, including tabs, where a general tab 184 has been selected. Additional information is provided in a Business Object section 190, which further indicates that Expense Item Documents 192 is the name of the business object (e.g., of the objects 42 of FIG. 2) that the current layout uses, which corresponds to the current descendant worksheet from which the present third example UI display screen 180 was launched.

A Business Object Catalog section 194 may or may not provide an indication 196 of how the business object catalog has been accessed. The indication 196 may indicate that the business object catalog was accessed via REpresentational State Transfer (REST) Application Programming Interfaces (APIs) and/or web services for resources. However, embodiments are not limited thereto. For instance, in certain implementations, the indication 196 may simply represent a name of a Business Object (BO) catalog, which does not necessarily indicate how the catalog was accessed. The indication 196 may simply map to the name of a catalog, e.g., of the business object catalogs 48 of FIG. 1.

In summary, the selected fields (164-168 in FIG. 5) are indicated under the Ancestor Columns section 202 as 204-208, respectively. The user has selected Expense Report ID 204 from Expense Reports worksheet (e.g., corresponding to the worksheet 112 of FIG. 3), Expense ID 206 from Expenses worksheet (e.g., corresponding to the worksheet 114 of FIG. 3) and Expense Itemizations ID 208 (e.g., from the from Expense Itemizations worksheet 116 of FIG. 3) as ancestor columns in Expense Item Documents worksheet (e.g., corresponding to the worksheet 118 of FIG. 3).

Figure 7:
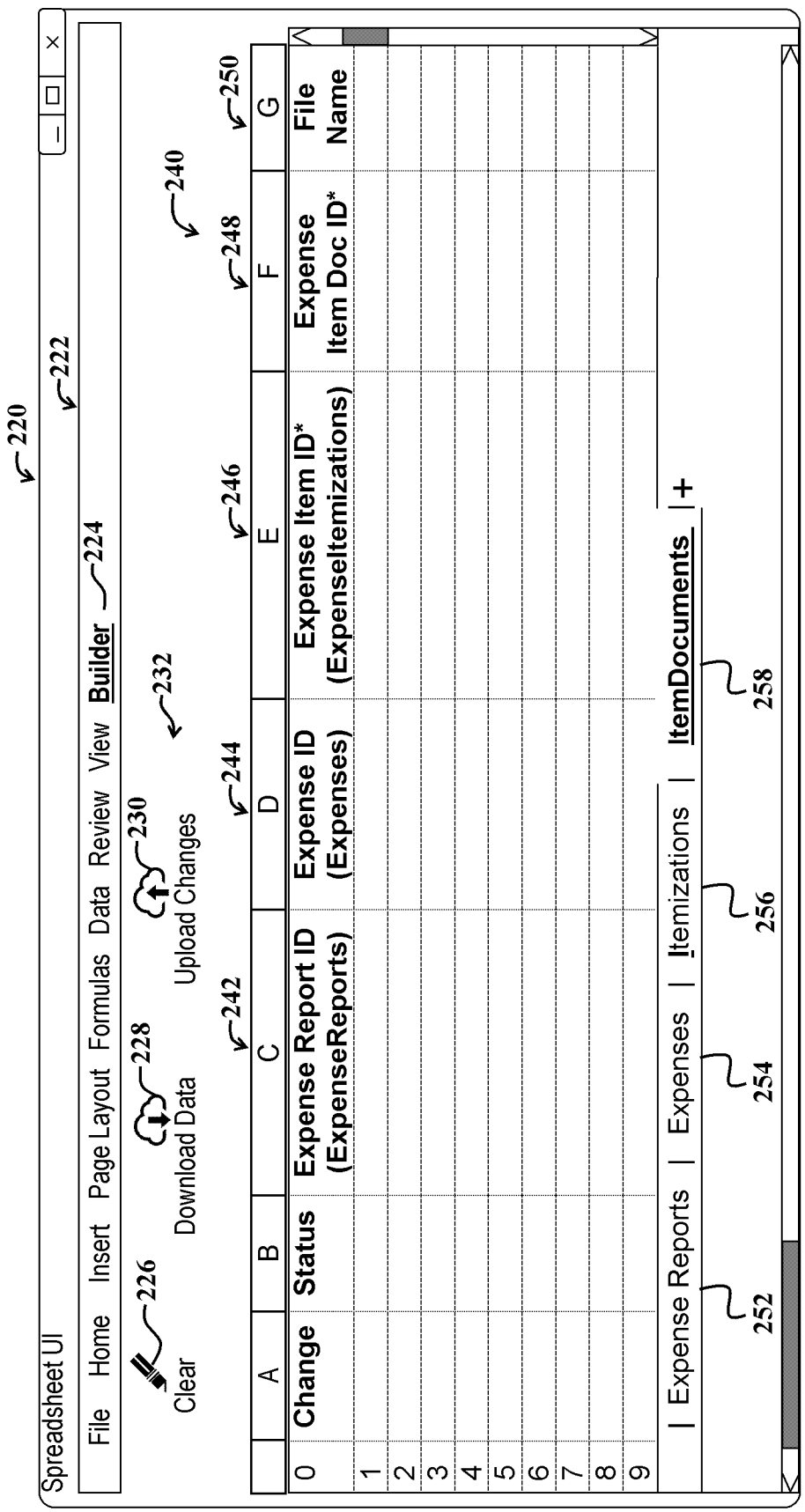
FIG. 7 illustrates a fourth example UI display screen showing data dimensions of the client-side descendant worksheet of FIGS. 1-2 after dimension headers have been added to the descendant worksheet, but before data has been downloaded to populate the fields of the associated dimensions.

FIG. 7 illustrates a fourth example UI display screen 220 showing data dimensions (A-G) of the client-side descendant worksheet 68 of FIGS. 1-2 after dimension headers (i.e., column headers) have been added to the descendant worksheet 68, as shown in a first descendant worksheet 240, but before data has been downloaded to populate fields of the associated dimensions.

The fourth example UI display screen 220 shows various example UI controls 232, including a Clear button 226, a Download Data button 228, and an Upload Changes button 230. These example UI controls 232 may be included among the UI controls 86 of FIG. 2. Various menu options 224 are also available. A Builder menu 224 has been selected. Note that selecting different menu options 224 may result in display of different UI controls than the UI controls 232 shown in a builder section 222 associated with the present descendant worksheet 240.

The first descendant worksheet table 240 shows various columns, including an Expense Report ID column 242, an Expense ID column 244, an Expense Itemization ID column 246, an Expense Item Documents ID column 248, and a File Name column 250. With reference to FIGS. 3 and 7, the headers for columns 242-248 identify columns 120, 124, 128, 136 of the worksheets 112-118 of FIG. 3, respectively. Also note that the fourth example UI display screen 220 also includes respective tabs 252-258 enabling user options to focus on (or otherwise identify) other columns from respective worksheets 112-118 of FIG. 3 that have been included in the first example descendant worksheet 240.

In summary, after redrawing the worksheet 240 that is configured with ancestor columns 242-248 the columns are rendered in the worksheet 240. The re-drawn worksheet 240 shows the new ancestor column 242-248 rendered in the worksheet 240. The ancestor columns 242-248 are added after Change and Status columns, i.e., columns A and B. The order of ancestor fields dictates the order of the columns as they appear in the worksheet 240.

Figure 8:
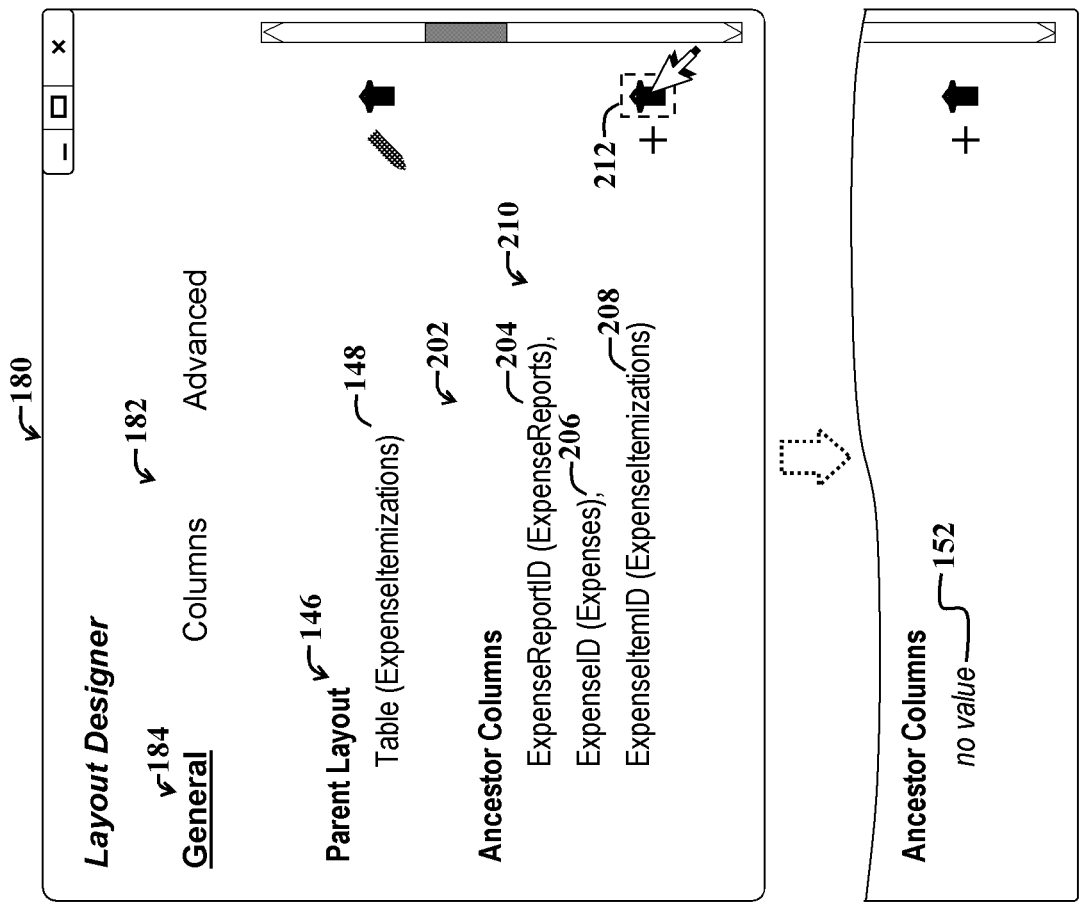
FIG. 8 illustrates a fifth example UI display screen showing a UI control for enabling a user to clear, i.e., remove, ancestor columns, e.g., non-direct ancestor columns, from the client-side descendant worksheet of FIGS. 1-2.

FIG. 8 illustrates a fifth example UI display screen 180 showing a UI control (clear ancestor columns button) 212 for enabling a user to clear, i.e., remove, ancestor columns, including non-direct ancestor columns, from the client-side descendant worksheet 68 of FIGS. 1-2 and the client-side descendant worksheet 118 of FIG. 3.

After user selection of the clear Ancestor Columns button 212, the resulting Ancestor Columns section 202 shows "no value" 152, indicating that the Ancestor Columns listing 202 has been cleared of values.

Figure 9:
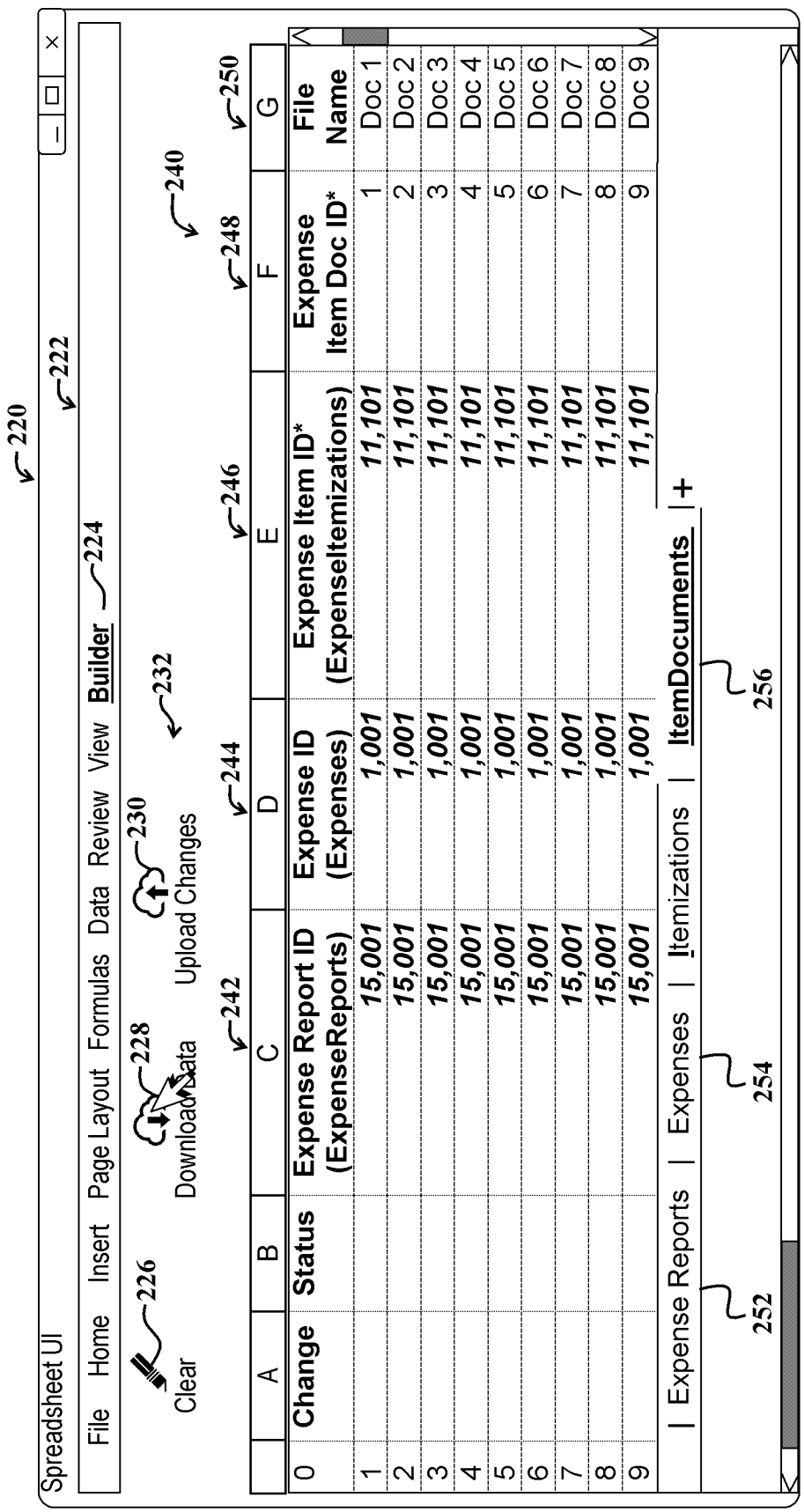
FIG. 9 illustrates a sixth example UI display screen, which represents an updated version of the fourth example UI display screen of FIG. 7 after a download operation has completed, and data has been fetched from one or more servers, e.g., via one or more request messages to one or more web services and/or Application Programming Interfaces (APIs), in response to user selection of a Download Data UI control.

FIG. 9 illustrates a sixth example UI display screen which represents an updated version of the fourth example UI display screen 220 of FIG. 7 after server-side data has been fetched from one or more servers, e.g., via one or more request messages to one or more web services (e.g., the web services 24 implementing the non-direct ancestor module 80 of FIG. 2).

After user selection of a Download Data UI control 228, the columns 242-250 are populated with data retrieved from the backend database(s) 46 of FIGS. 1 and 2, e.g., from the server-side columns 84 of FIG. 2.

In summary, a user clicks the Download Data button 228, resulting in the downloading of data from a server-side database via one or more web services. The download operation populates the ancestor column cells 242-246 if they have not yet been populated as well as the editable cells of the worksheet 240, i.e., cells of the File Name column 250 and the Expense Item Documents ID column 248. The Expense Item Documents ID column 248 represents a key/ID column for the present worksheet 240 and associated business object. An expense Item ID column 246 represents the parent (direct) column for the worksheet 240 and associated business object.

Figure 10:
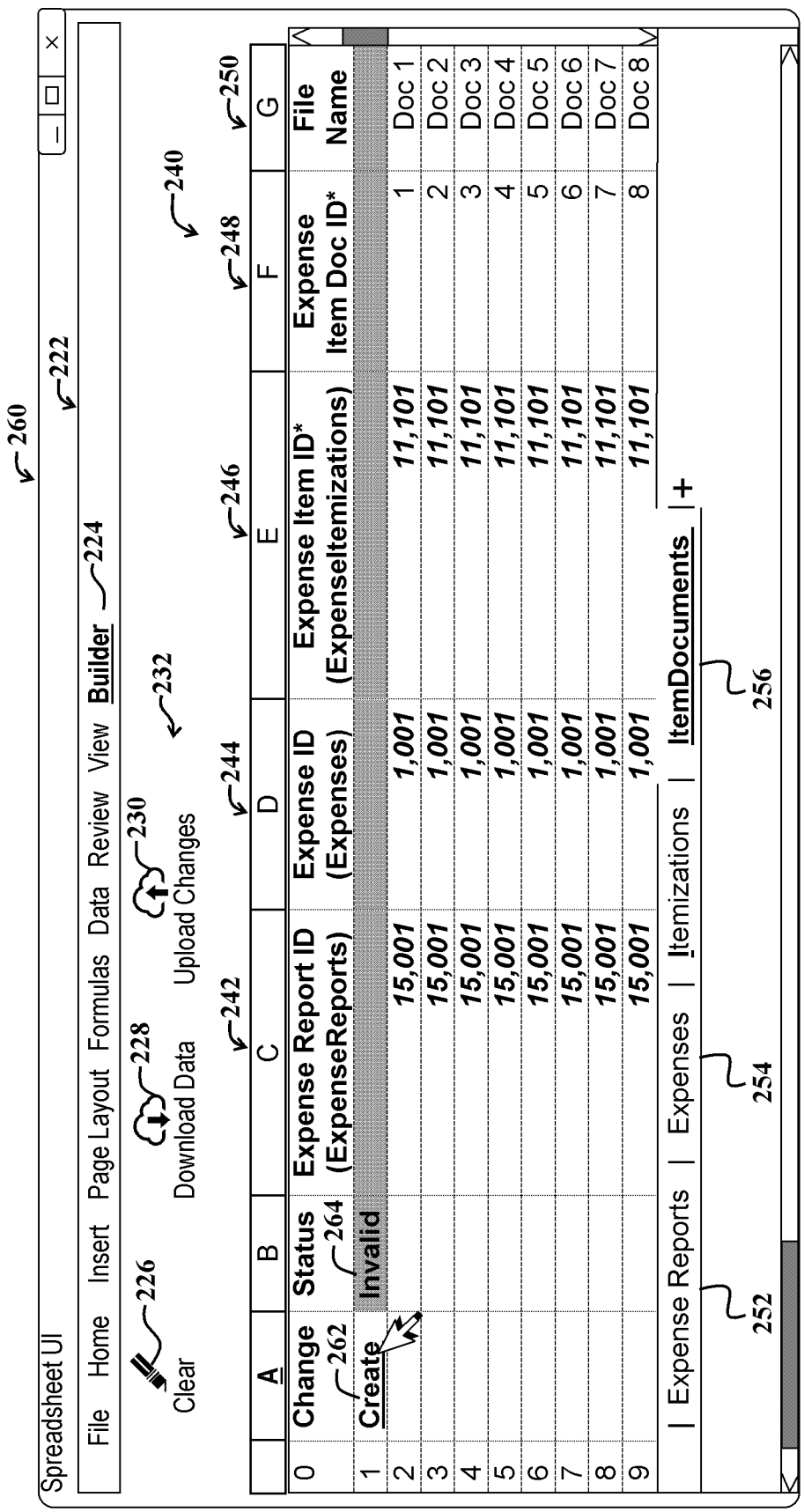
FIG. 10 illustrates a seventh example UI display screen showing a UI control for enabling the insertion/creation of a new row of cells in the client-side descendant worksheet of FIGS. 1-2.

FIG. 10 illustrates a seventh example UI display screen 260 showing a Create UI indicator 262 showing that the associated row (row 1) has been marked for creation of a new row of cells (A1-G1) in the client-side descendant worksheet 68 of FIGS. 1-2

Note that to populate the cells of the new row (now row 1), the user first enters a valid value for a corresponding field in the Expense Item Documents column 248, which represents the left most editable column in the worksheet 240. In certain scenarios and implementations, a user may be required to enter values in additional cells before the Invalid indication 264 clears and the row is ready for download operations. Generally, when valid values have been entered into one or more appropriate fields of the new row (row 1) to be created, this results in automatic population of (with data) corresponding cells of the non-editable non-direct ancestor cells of the non-direct ancestor columns, as shown in FIG. 11.

Note that cells of the non-direct ancestor columns 242, 244 are read-only in the present specific example embodiment. Values in non-direct ancestor column cells (e.g., values in columns 242-246) will be ignored in an upload request (e.g., when a user selects an upload changes button 230). After specifying a valid parent, cells in non-direct ancestor columns, e.g., columns 242, 244 will show corresponding values automatically. A Parent can be specified using the Layout Designer UI, e.g., via the Parent Layout section 146 of FIG. 4. Note however that embodiments are not limited to these requirements. For instance, embodiments where non-direct ancestor columns are not read-only are possible.

If required data (sufficient to link the worksheet 240 with non-direct ancestor worksheets) is not provided, the Invalid indicator 264 persists in a status column (column B).

Figure 11:
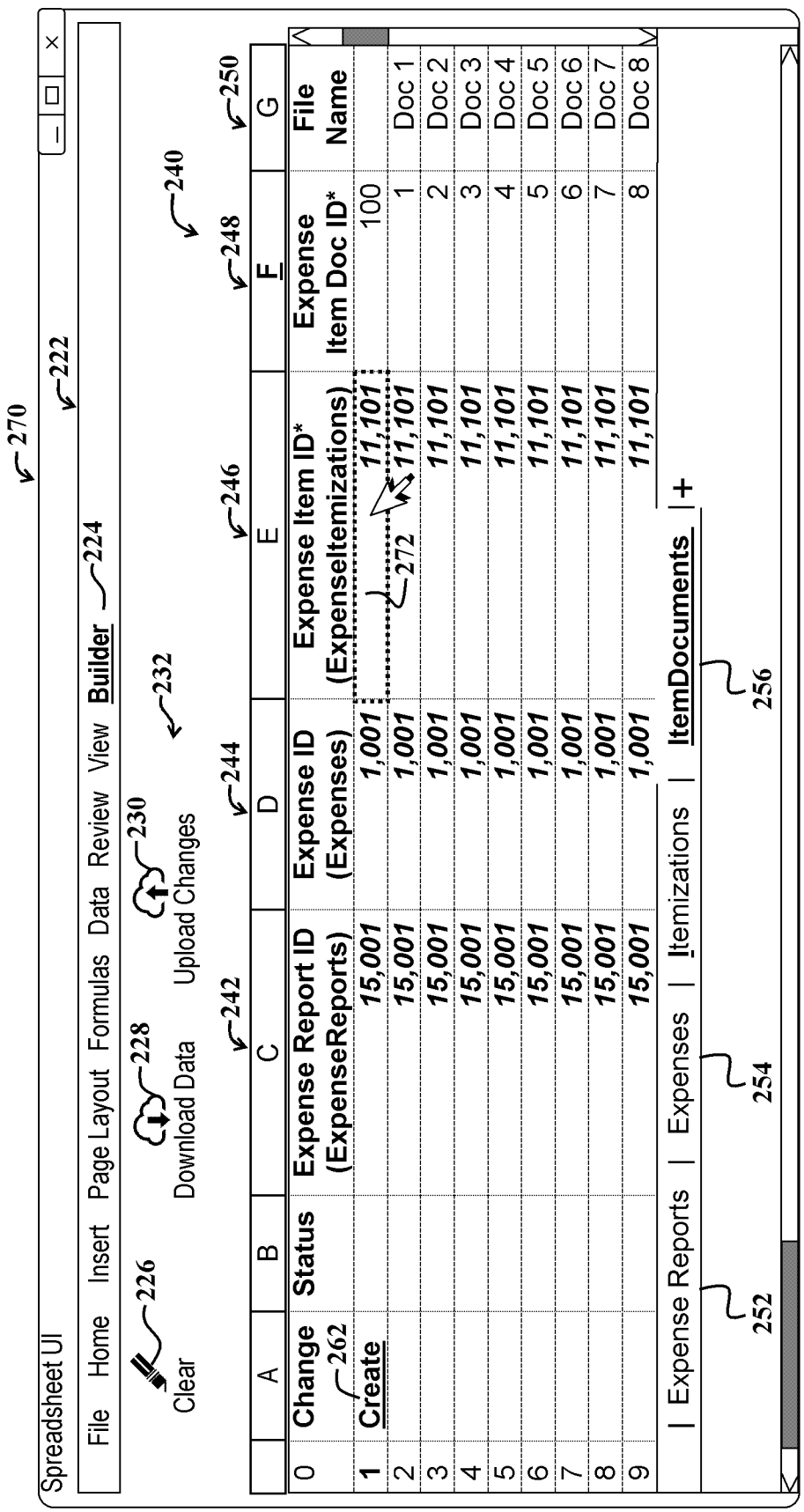
FIG. 11 illustrates an eighth example UI display screen showing an example valid entry entered into a direct parent cell of the client-side descendant worksheet of FIGS. 1-2, thereby enabling subsequent automatic updating of associated non-direct ancestor columns.

FIG. 11 illustrates an eighth example UI display screen 270 showing an example valid entry 272 entered into a field of the Expense Item ID column 246, thereby enabling subsequent automatic updating of associated non-direct ancestor columns, including the Expense Report ID column 242 and the Expense ID column 244.

Note that the Expense Item ID column 246 represents a direct parent column of the worksheet 240 and associated business object. Entering a valid entry in a direct parent column, i.e., in the Expense Item ID column 246, thereby triggers automatic updating of non-direct ancestor columns 242 and 244.

Providing the valid entry 272 helps the underlying system to link the Expense Item Documents worksheet 118 of FIG. 3 with the ancestors represented by the worksheets 112-116 of FIG. 3. Note that the Expense Item Documents ID column 248 is not a direct parent column, but rather, it is regular column like the File Name column 250 in the Expense Item Documents worksheet 240 (corresponding to the ItemDocuments tab 256).

Accordingly, after specifying a valid parent and providing sufficient data entries in one or more fields, cells in non-direct ancestor columns 242, 244 will show corresponding values automatically. The Invalid status indicator 264 of the seventh UI display screen 260 of FIG. 10 is then removed, resulting in the eighth UI display screen 270 of FIG. 11.

Figure 12:
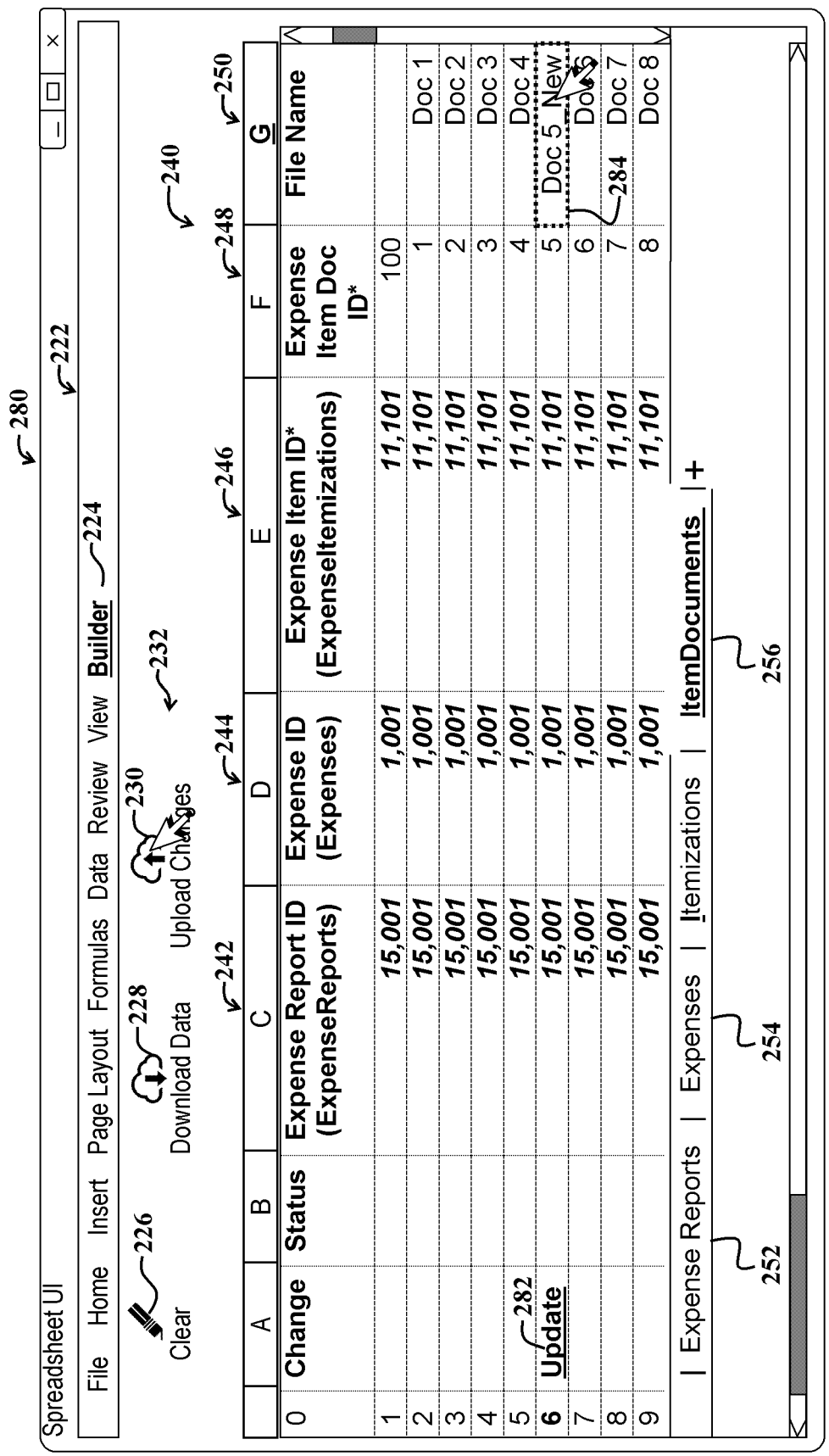
FIG. 12 illustrates a ninth example UI display screen showing an example edited field of the client-side descendant worksheet, the data of which is ready for uploading and updating of the corresponding server-side hierarchical object data model.

FIG. 12 illustrates a ninth example UI display screen 280 showing an example edited field 284 of the client-side descendant worksheet (e.g., worksheet 68 in FIGS. 1 and 2, worksheet 118 in FIG. 3, and worksheet 240 in FIGS. 7, 9-12). The edited field represents an edited or new document.

After editing and/or otherwise replacing a document with a new document, as indicated in the edited field 284, an Update indicator appears 282 in the Change column (column A), marking the row (row 6) for updating. Upon subsequent user selection of the Upload Changes button 230, changes are then uploaded to the backend database(s) (e.g., the databases 46 of FIGS. 1 and 2) via one or more web services (e.g., the web services 24 of FIGS. 1 and 2), as discussed more fully below with reference to FIG. 13.

Figure 13:
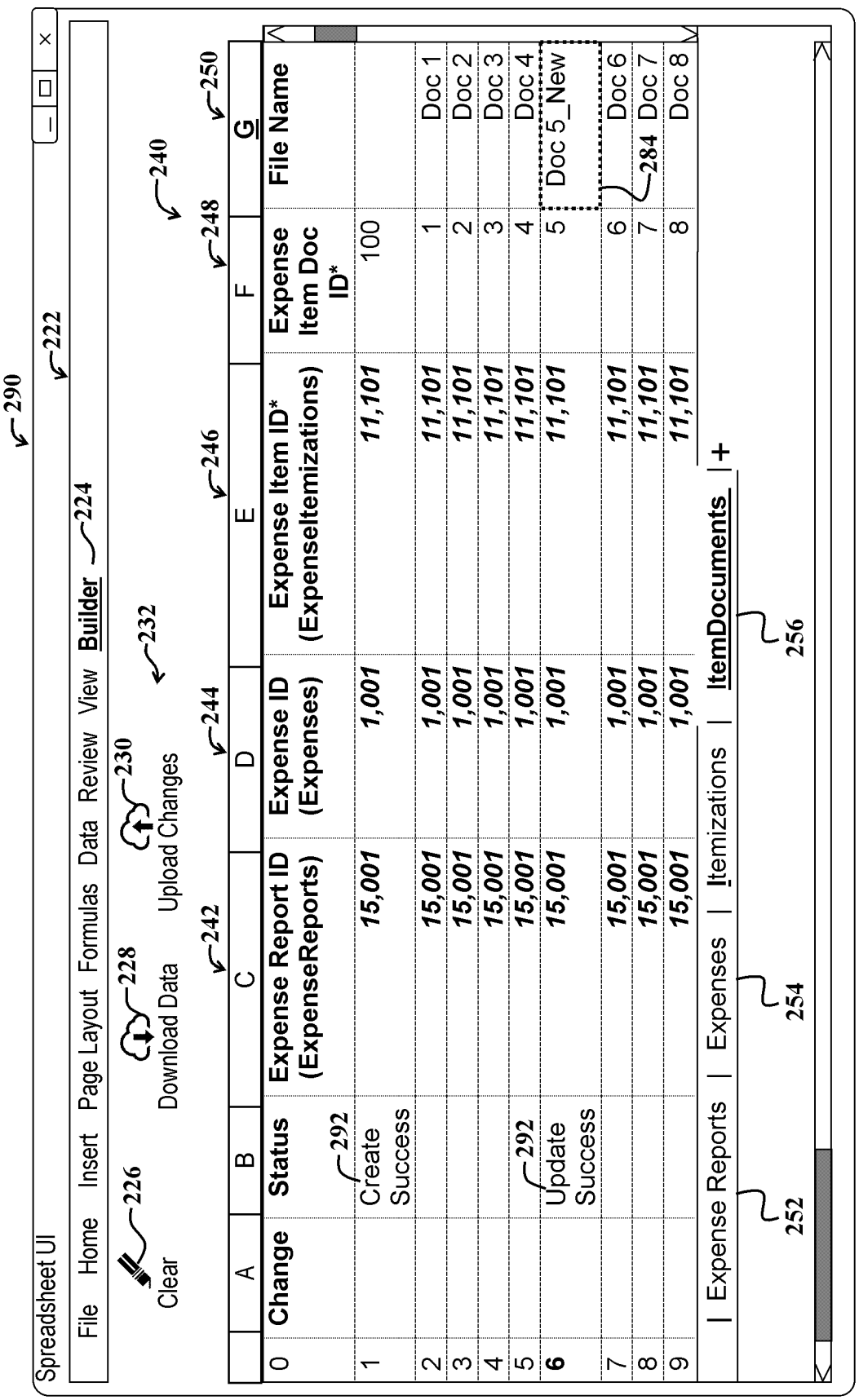
FIG. 13 illustrates a tenth example UI display screen showing the resulting client-side descendant worksheet after the update of FIG. 12 has been uploaded to one or more servers.

FIG. 13 illustrates a tenth example UI display screen 290 showing the resulting client-side descendant worksheet 240 after the update 284 of FIG. 12 and the row creation of FIGS. 10-11 have been uploaded to one or more servers, e.g., uploaded to the cloud and accompanying backend database(s) 46 of FIGS. 1 and 2.

The updated tenth UI display screen 290 includes an updated status column (column B), showing row Create Success 292 and an Update Success 292.

Figure 14:
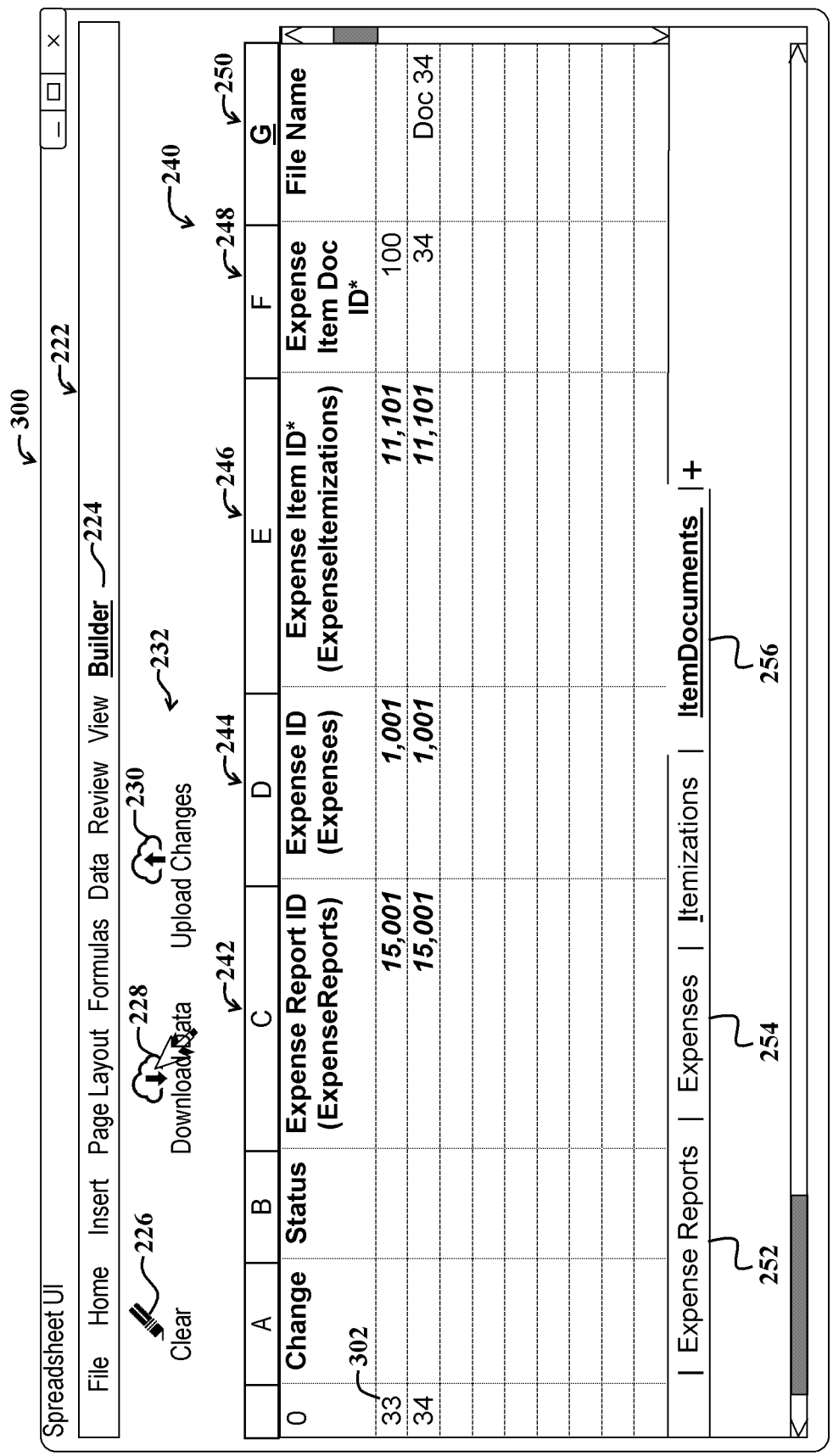
FIG. 14 illustrates an eleventh example UI display screen showing an example new row, created via the UI display screens of FIGS. 10 and 11, and further illustrating how a newly created row may appear in a different location in the worksheet after refreshing the accompanying worksheet via user selection of a download data button.

FIG. 14 illustrates an eleventh example UI display screen 300 showing an example new row (row 33) 302, a new row has been created as discussed with reference to FIG. 11, and after the client-side descendant worksheet 240 has been refreshed responsive to user selection of a download data UI control 228, whereby corresponding cells of non-direct ancestor columns 242, 244 are populated with data therefrom after fetching from the corresponding server-side data objects of the server-side hierarchical object data model.

User selection of the Download Data button 228 refreshes the worksheet 240. Note that after a refresh, a newly created row may appear in a different location, e.g., at row 302, e.g., at row number 33.

Figure 15:
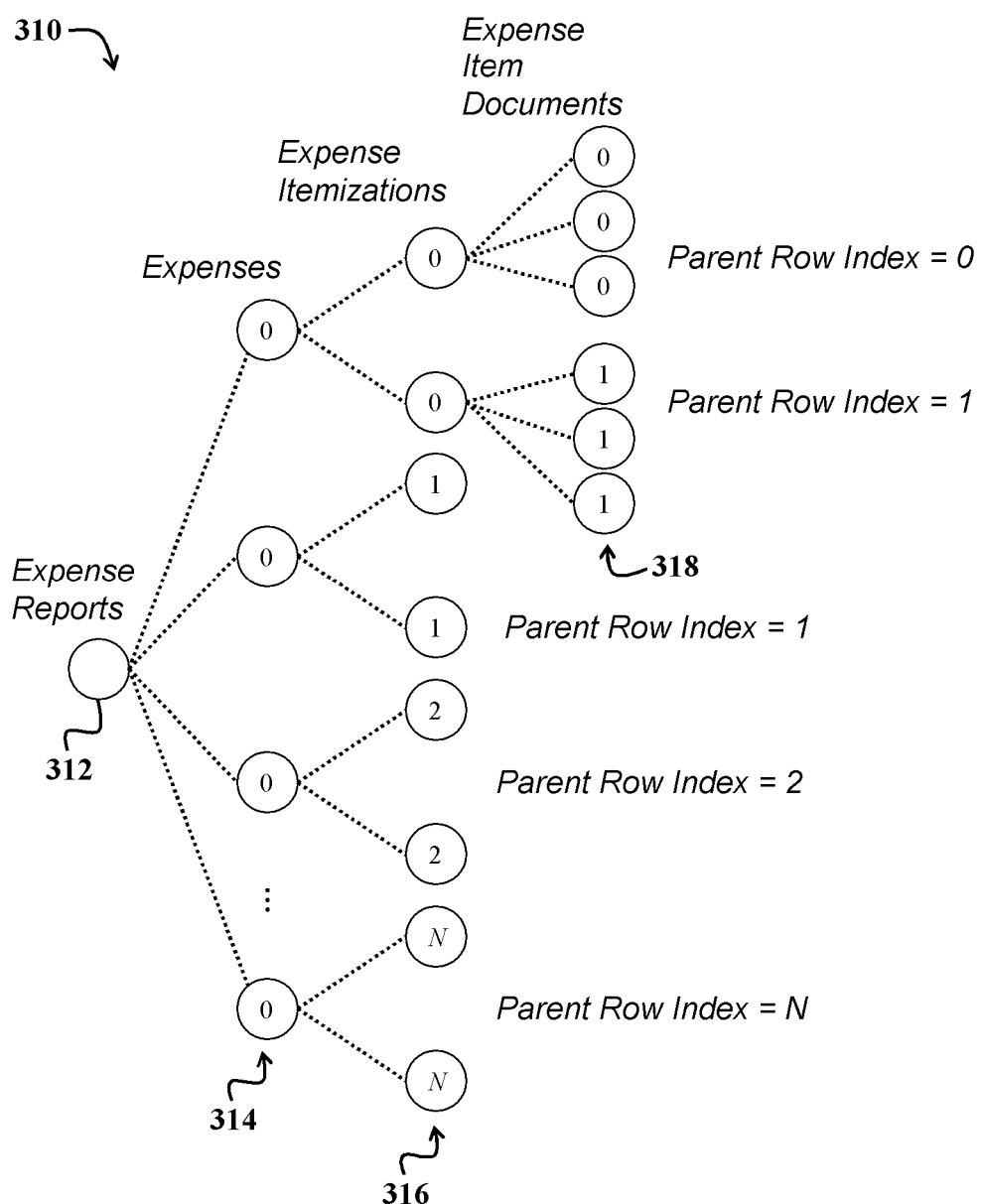
FIG. 15 illustrates example worksheet indexing used to implement traversal of an example hierarchy to retrieve server-side non-direct ancestor columns into a client-side descendant worksheet.

FIG. 15 illustrates example worksheet indexing used to implement traversal of an example hierarchy 310 to retrieve server-side non-direct ancestor columns into a client-side descendant worksheet.

The example worksheet hierarchy includes an Expense Reports column 312, an Expenses column 314, an Expense Itemizations column 316, and an Expense Item Documents column 318, corresponding to different levels of a hierarchical structure of an example workbook of worksheets.

In FIG. 15, nodes are labeled in accordance with a row index of their parent nodes. Viewing the example hierarchy 310 from top to bottom, the row index of a node at a given level increases as one moves downward on the page. For instance, the Expenses column 314 includes for nodes, where the top node has a row index of 0 (counting from 0, as opposed to from 1); then second node down has a row index of 1, and so on. The bottom node of the Expenses column 314 has a row index of N, assuming that the Expenses column 314 has N nodes.

Note that a row index for a node in the hierarchy 310 is not the same as the node label shown in FIG. 15. The row index is the node label for any of that node's direct children.

In summary, the example hierarchy 310 depicts how ancestor-child relationships are tracked across multiple levels in a hierarchy. Each node may represent a row in a worksheet. The number (node label) inside a node is the row index of this child's parent.

A row index (at the top of FIG. 15) starts with 0. For example, there is only one record (index 0) in the top-level Expense Reports worksheet 312. In the Expenses worksheet column 314, all records are from the same parent, i.e. Expense Report 312 with row index 0. In the Expense Itemizations worksheet column 316, every two rows are from the same expense.

To be more specific, the first two rows are from the first expense (row index 0 in the Expenses spreadsheet column 314). The next two expense itemizations are from the expense with row index 1. In Expense Item Documents worksheet column 318, the first three rows are all from an itemization with row index 0. The next three rows are from itemization with row index 1.

Figure 16:
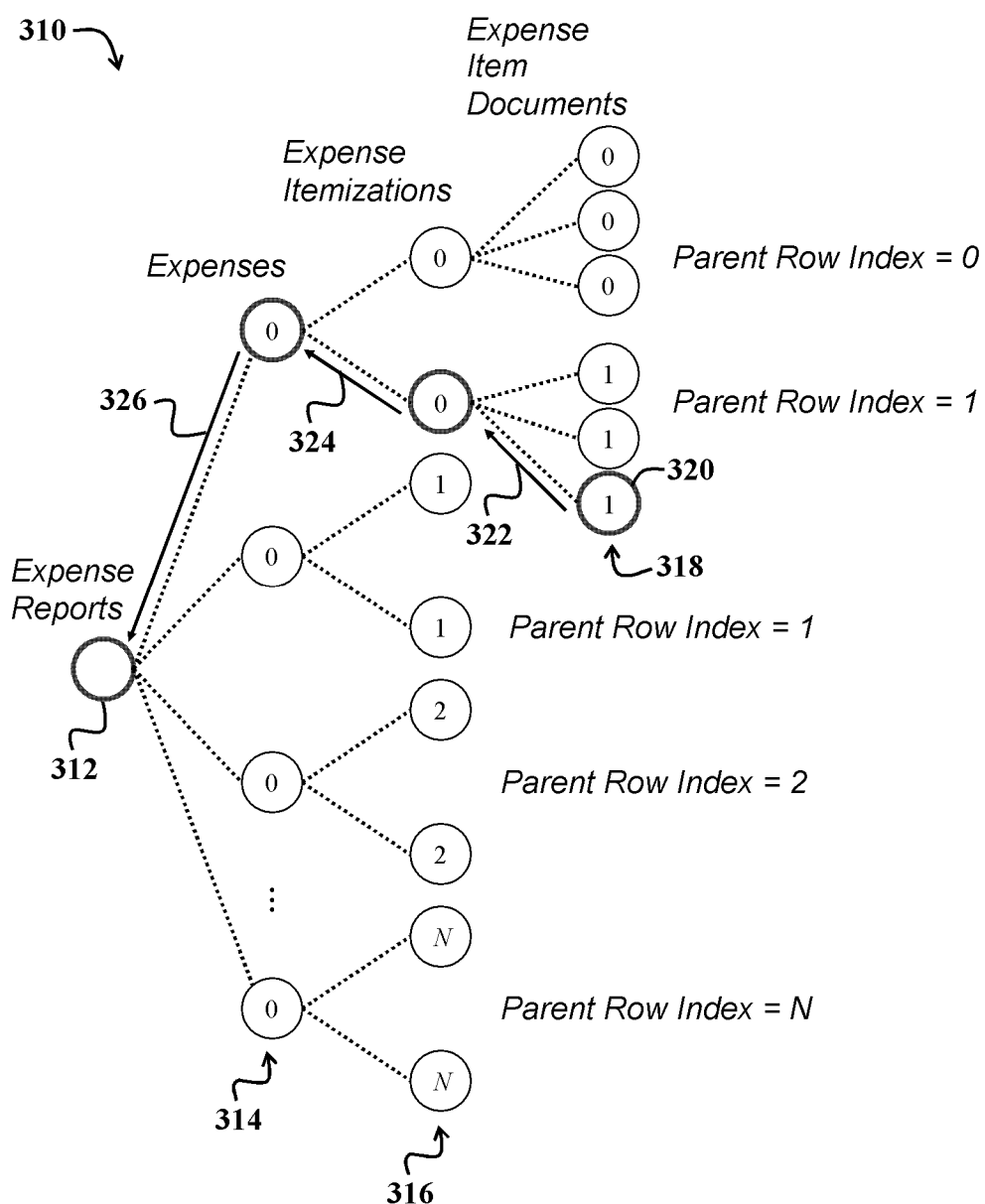
FIG. 16 illustrates an example hierarchy traversal employed to retrieve non-direct ancestor columns of a client-side descendant worksheet for display therein.

FIG. 16 illustrates an example hierarchy traversal of the hierarchy 310 of FIGS. 15 and 16, in a process of retrieving non-direct ancestor columns of a client-side descendant worksheet for display therein. Note that the Expenses column 314 and the Expense Reports column 312 are non-direct ancestors of the lower level Expense Item Documents column 318.

An example traversal of the hierarchy traverses three steps 322-326 in the process of fetching ancestor column cell values for the sixth row (i.e., the last row) of the Expense Items documents column 318.

Given its parent row index is 1, the traversal algorithm traverses up a level (via a first traversal step 322) and locates the second row (i.e. row index 1) in the Expense Itemizations worksheet column 316. A sought value is then retrieved from the desired column.

To populate grandparent columns (e.g., Expenses columns from the Expenses column 314), then knowing the parent row index is 0, the traversal algorithm continues traversing up a level (in a second traversal step 324) and locates the first row (row index in the Expenses worksheet column 314. This is used to look up, i.e., obtain, a sought value in the Expenses column 314 for inclusion in among the descendant node 320 of the Expense Items Documents worksheet column 318.

Figure 17:
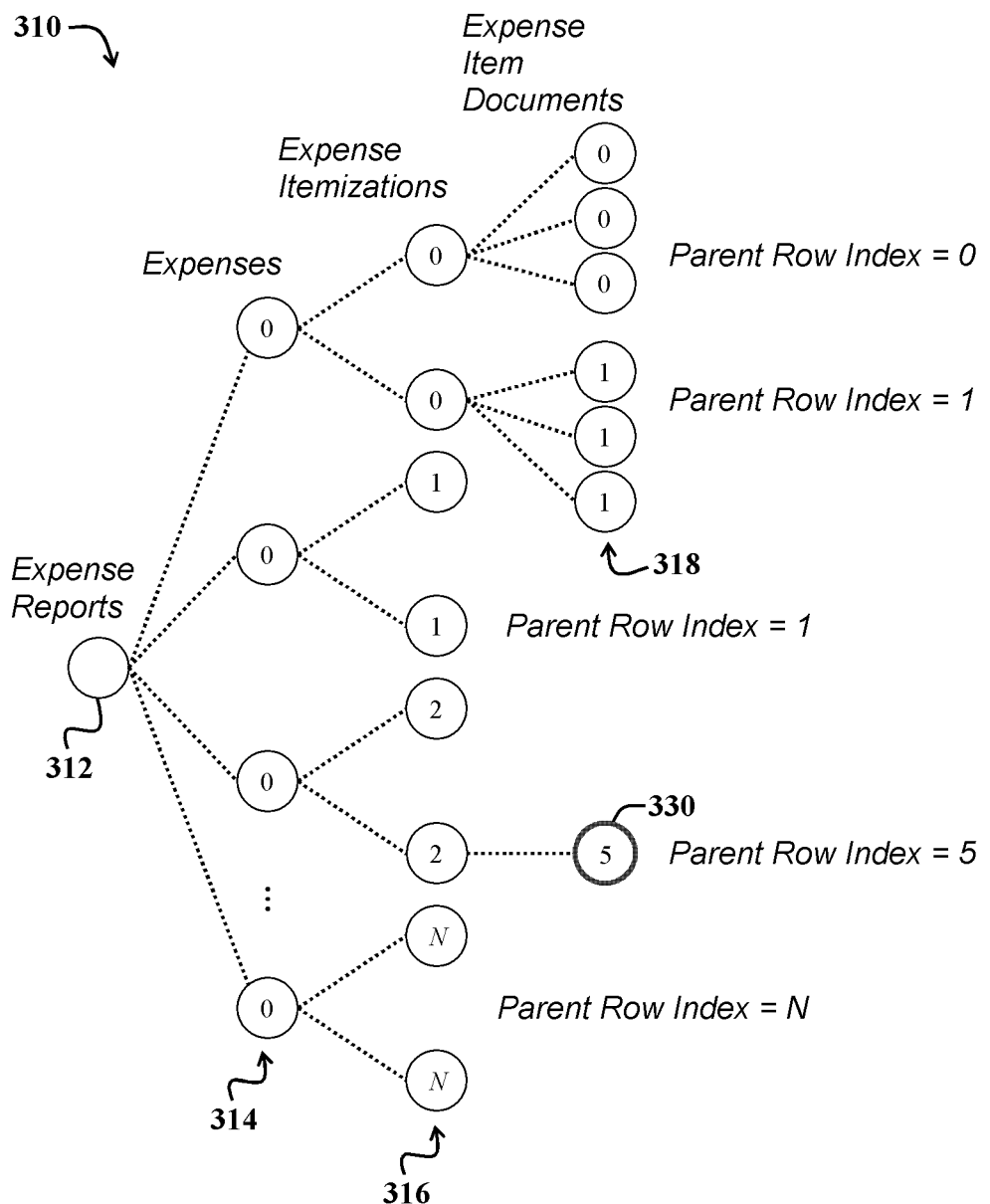
FIG. 17 illustrates the creation of a descendant worksheet node (e.g., row) in the worksheet hierarchy (e.g., characterizing a client-side spreadsheet workbook and corresponding server-side object data hierarchy), where valid non-empty values have been provided to all direct parent columns, so as to facilitate linking the newly created descendant worksheet node.

FIG. 17 illustrates the creation of a descendant worksheet node (e.g., row) 330 in the worksheet hierarchy 310 (e.g., characterizing a client-side spreadsheet workbook and corresponding server-side object data hierarchy), where valid non-empty values have been provided to all direct parent columns, so as to facilitate linking the newly created descendant worksheet node 330 with the ancestors, including non-direct ancestors thereof.

In summary, to create a row, e.g., represented by the new descendant worksheet node 330 of the Expense Item Documents column 318, users input valid non-empty values in all direct parent columns, i.e., in the Expense Itemizations column 316 in the present example embodiment.

This is used to link up this newly created child row (e.g., row 330) with its parent in the hierarchy. For example, suppose the entered values match the sixth row (row index 5) in Expense Itemizations worksheet column 316, then this row is added in the hierarchy as a child of Expense Itemizations with row of index 5.

Figure 18:
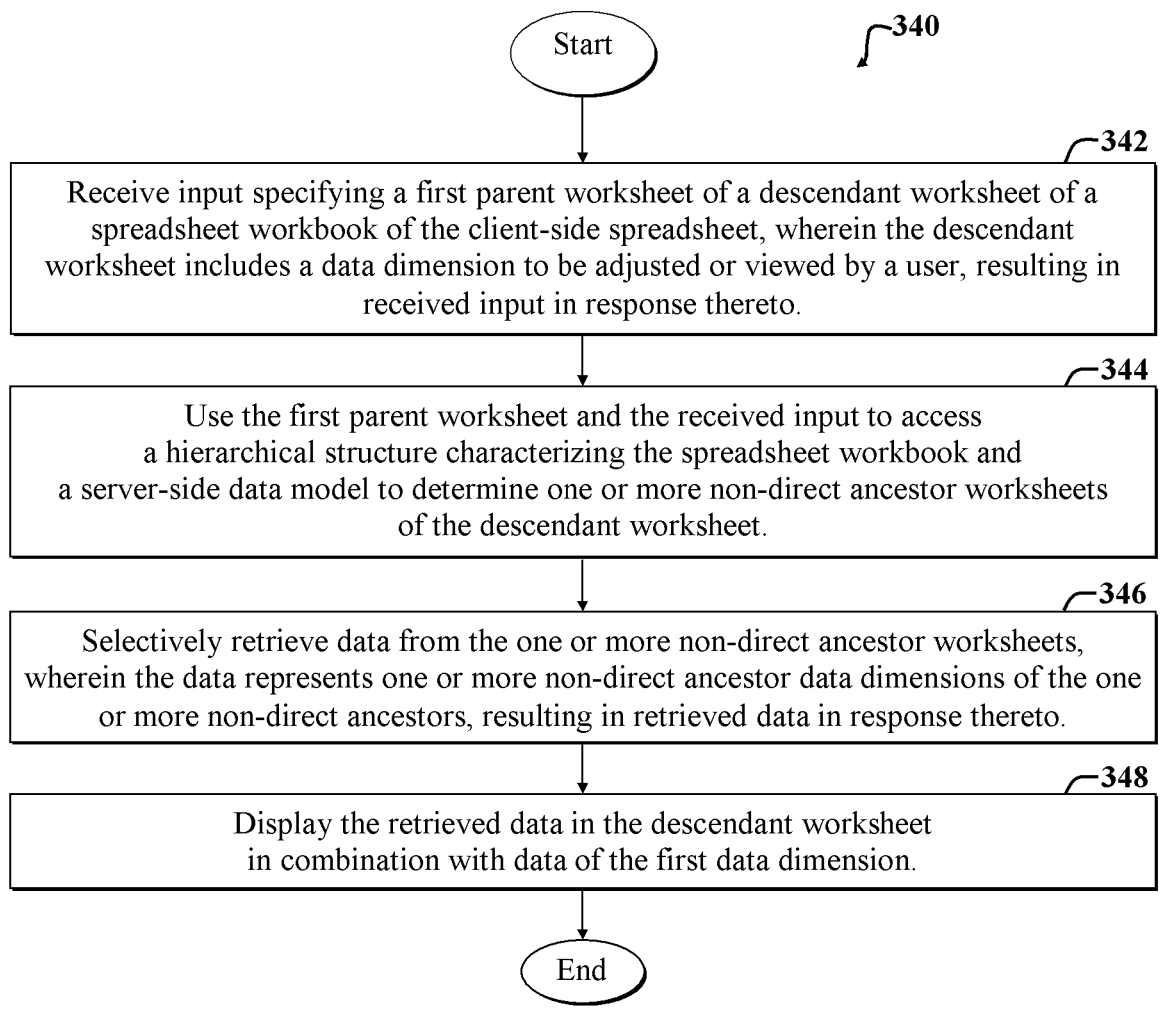
FIG. 18 is a flow diagram of a first example method suitable for use with the embodiments of FIGS. 1-8.

FIG. 18 is a flow diagram of a first example method 340 suitable for use with the embodiments of FIGS. 1-8. The first example method 340 facilitates client-side access to context information in a client-side worksheet of a spreadsheet workbook (e.g., the workbook 26 of FIG. 1) that communicates with one or more servers (e.g., represented by the server system 14 of FIGS. 1 and 2).

The first example method 340 includes an initial input-receiving step 342, which includes receiving input specifying a first parent worksheet of a descendant worksheet of a spreadsheet workbook of the client-side spreadsheet (e.g., the spreadsheet 16 of FIGS. 1 and 2). The descendant worksheet includes a data dimension (e.g., column) to be adjusted or viewed by a user.

A subsequent accessing step 344 includes using the first parent worksheet and the received input to access a hierarchical structure characterizing the spreadsheet workbook and a server-side data model (e.g., corresponding to the hierarchical object data model 40 of FIGS. 1 and 2) to determine one or more non-direct ancestor worksheets of the descendant worksheet.

Next, a data-retrieving step 346 includes retrieving data from the one or more non-direct ancestor worksheets (e.g., the non-direct ancestor worksheets 112, 114 of FIG. 3), wherein the data may represent and/or include one or more non-direct ancestor data dimensions (e.g., the Expense Report ID column 120 and Expense ID column 124 of FIG. 3) of the one or more non-direct ancestors, resulting in retrieved data in response thereto. Note that retrieval of non-direct ancestor data dimensions may occur simultaneously with retrieval of other data, without departing from the scope of the present teachings.

Finally, a displaying step 348 includes displaying the retrieved data in the descendant worksheet in combination with data of the first data dimension.

Note that the first example method 340 may be modified, without departing from the scope of the present teachings. For instance, the method 340 may further specify a step of using an add-in in the spreadsheet to coordinate communications between the spreadsheet and one or more servers and/or associated database(s) hosting a data model (e.g., characterized by the hierarchy 44 of FIGS. 1 and 2) corresponding to a structure of the spreadsheet workbook (e.g., a structure of the workbook hierarchy 28 of FIG. 1, or hierarchy 110 of FIG. 3) via one or more web services.

The data retrieving step 346 may further include receiving input from one or more UI controls indicating the one or more non-direct ancestor data dimensions for display in the descendant worksheet.

The first data dimension may include one or more columns of the descendant worksheet. The one or more non-direct ancestor data dimensions (e.g., corresponding to the Expense Report ID column 120 and Expense ID column 124 of FIG. 3) represent one or more columns of the one or more non-direct ancestor worksheets (e.g., corresponding to the Expense Reports worksheet 112 and Expenses worksheet 114 of FIG. 3). Accordingly, the first data dimension may contain one or more columns that represent fields from the relevant (descendant) business object. Note that while examples discussed herein show only a File Name column (e.g., column 250 of FIG. 13), other fields (e.g., Author, Authoring Date, etc.) may also be included in the worksheets, without departing from the scope of the present teachings.

The data retrieving step 346 may further include accessing a web service that is in communication with the remote server (e.g., a server of the server system 14 of FIGS. 1 and 2) to retrieve data corresponding to the one or more non-direct ancestor worksheets.

The first example method 340 may further include performing the following steps: detecting a modification to the first data dimension in the descendant worksheet; and receiving a signal to update data of the server-side data model corresponding to the first data dimension in response to the detecting.

The one or more columns of the one or more non-direct ancestor worksheets may be read-only in the descendant worksheet.

The data-retrieving step 346 may further include using a hierarchy traversal algorithm to determine the one or more columns of the one or more non-direct ancestor worksheets to retrieve for display in the descendant worksheet in accordance with predetermined workbook configuration information.

With reference to FIGS. 15-18, the hierarchical traversal algorithm may include using different indices or labels assigned to each worksheet of the spreadsheet workbook to: traverse from the descendant worksheet to the parent worksheet; traverse from the parent worksheet to a first non-direct ancestor worksheet, wherein the first non-direct ancestor worksheet represents a parent of the parent worksheet; retrieve one or more values from the first non-direct ancestor worksheet, wherein the one or more values includes a header of a first non-direct ancestor data dimension, and wherein the first non-direct ancestor data dimension represents a column of the first non-direct ancestor worksheet; and display the one or more values in the descendant worksheet in combination with the first data dimension, wherein the first data dimension represents an editable column or columns of the descendant worksheet.

Figure 19:
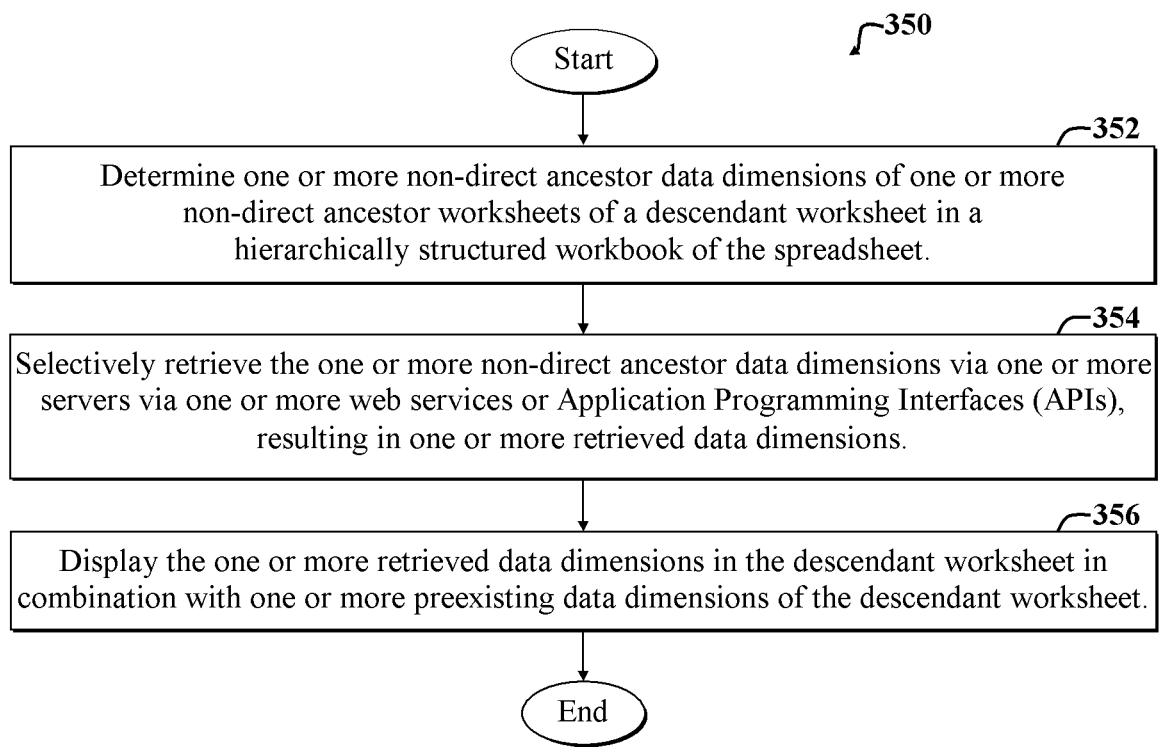
FIG. 19 is a flow diagram of a second example method suitable for use with the embodiments of FIGS. 1-9.

FIG. 19 is a flow diagram of a second example method 350 suitable for use with the embodiments of FIGS. 1-9. The second example method 350 facilitates retrieving context information into a client-side worksheet of a spreadsheet (e.g., the spreadsheet 16 of FIGS. 1 and 2).

The second example method includes a first step 352, which involves determining one or more non-direct ancestor data dimensions of one or more non-direct ancestor worksheets of a descendant worksheet in a hierarchically structured workbook (e.g., the workbook 26 of the spreadsheet 16 of FIG. 1).

A second step 354 includes selectively retrieving the one or more non-direct ancestor data dimensions (e.g., columns) via one or more servers (e.g., from the backend database(s) 46 of FIGS. 1 and 2) via one or more web services or Application Programming Interfaces (APIs), resulting in one or more retrieved data dimensions.

A third step 356 includes displaying the one or more retrieved data dimensions (e.g., corresponding to the fetched columns 132, 134 of FIG. 3) in the descendant worksheet (e.g., corresponding to the Expense Item Documents worksheet 118 of FIG. 3) in combination with one or more preexisting data dimensions (e.g., corresponding to the document listing column 138 of FIG. 3) of the descendant worksheet.

Note that the second example method 350 may be modified, without departing from the scope of the present teachings. For example, the one or more retrieved data dimensions and the one or more preexisting data dimensions may include or represent one or more columns of data. The method 350 may be updated to specify that the spreadsheet is installed on a client system and includes an add-in (e.g., corresponding to the service-interface add in 18 of FIGS. 1 and 2) for communicating with server-side data via one or more web services.

The server-side data may be characterized by a data structure that is similar to a structure of the hierarchically structured workbook of the spreadsheet (e.g., where the workbook hierarchy 28 of FIG. 1 is similar in structure and contents to the server-side data model hierarchy 44).

The second step 354 may further include receiving input in the descendant worksheet specifying a parent worksheet of the descendant worksheet, resulting in received input; and using the received input to retrieve the one or more non-direct ancestor data dimensions from one or more ancestors of the parent worksheet for subsequent display in the descendant worksheet.

The third step 356 may further include accessing a web service that is in communication with a remote server (of the one or more servers) to retrieve data corresponding to the one or more non-direct ancestor worksheets.

The second example method 350 may further include detecting a modification to a first data dimension of the one or more preexisting data dimensions in the descendant worksheet; and then receiving a signal to update data of a server-side data model corresponding to the first data dimension in response to the detecting.

Figure 20:
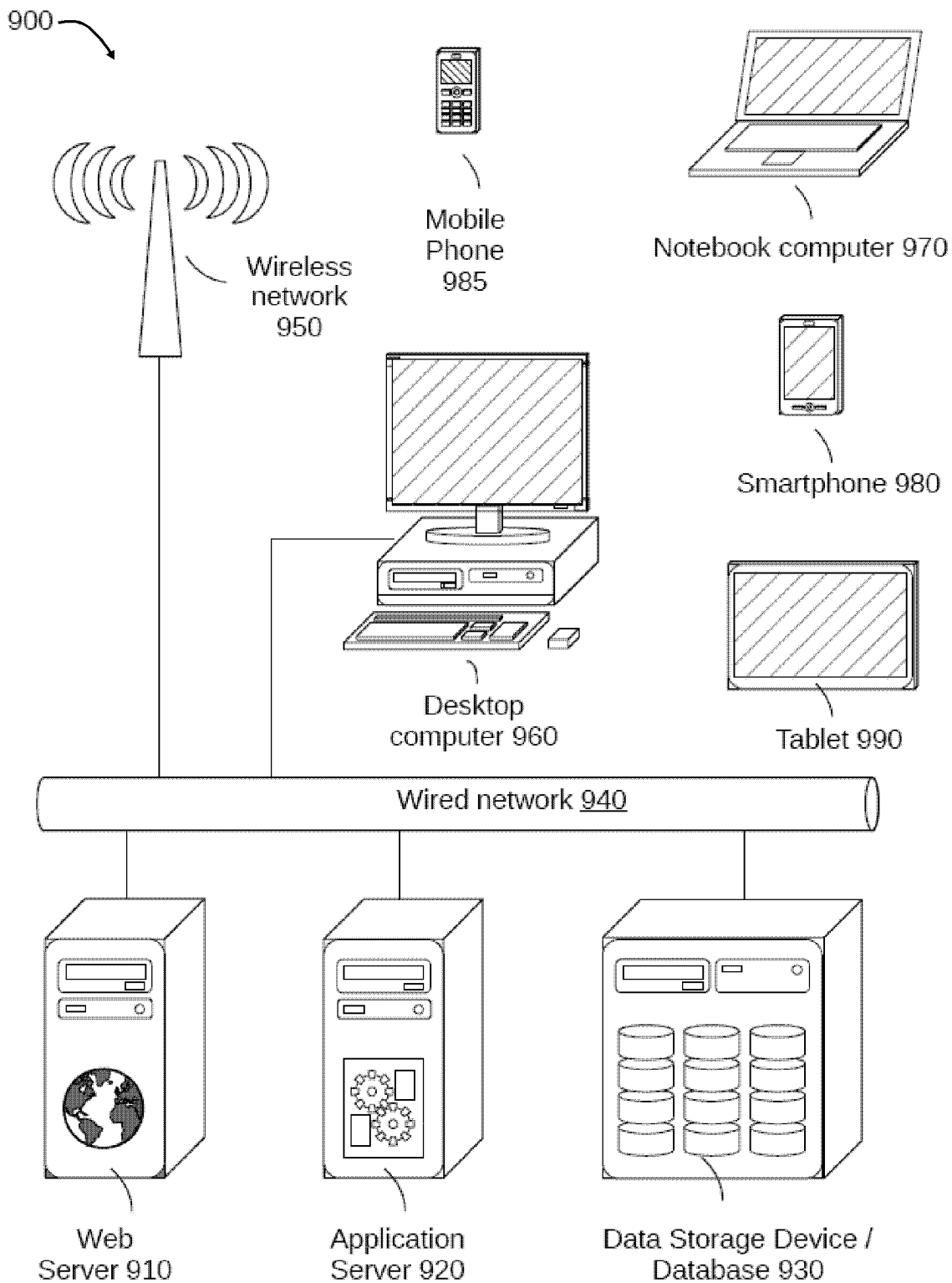
FIG. 20 illustrates a block diagram of an example network environment, which may be used for implementations described herein.

FIG. 20 is a general block diagram of a system 900 and accompanying computing environment usable to implement the embodiments of FIGS. 1-19. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computing devices 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1, 2, and 20, the client systems 12 of FIG. 1 may be implemented via one or more of the mobile phone 985, notebook computer 970, smartphone 980, desktop computer 960, or tablet 990 of FIG. 20. The backend database 46 of FIGS. 1 and 2 may be implemented via the data storage device/database 930 of FIG. 20. The server system 14 of FIGS. 1 and 2 maybe implemented by the web server 910 and the application server 920 of FIG. 20.

Figure 21:
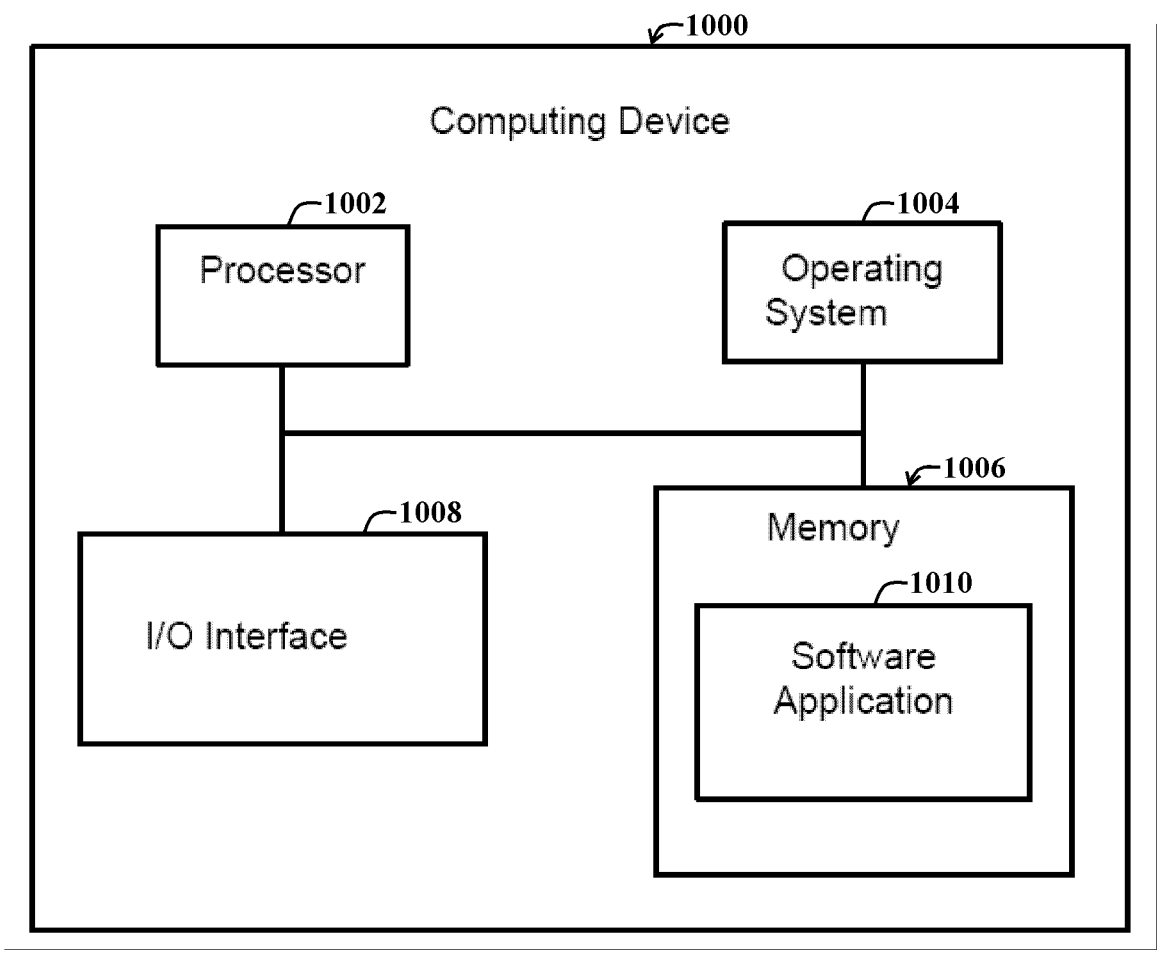
FIG. 21 illustrates a block diagram of an example computing device or system, which may be used for implementations described herein.

FIG. 21 illustrates a block diagram of an example computing device or system 500, which may be used for implementations described herein. For example, the computing device 1000 may be used to implement server devices 910, 920 of FIG. 20 as well as to perform the method implementations described herein. In some implementations, the computing device 1000 may include a processor 1002, an operating system 1004, a memory 1006, and an input/output (I/O) interface 1008.

In various implementations, the processor 1002 may be used to implement various functions and features described herein, as well as to perform the method implementations described herein. While the processor 1002 is described as performing implementations described herein, any suitable component or combination of components of the computing device 1000 or any suitable processor or processors associated with the device 1000 or any suitable system may perform the steps described. Implementations described herein may be carried out on a user device, on a server, or a combination of both.

The example computing device 1000 also includes a software application 1010, which may be stored on memory 1006 or on any other suitable storage location or computer-readable medium. The software application 1010 provides instructions that enable the processor 1002 to perform the functions described herein and other functions. The components of computing device 1000 may be implemented by one or more processors or any combination of hardware devices, as well as any combination of hardware, software, firmware, etc.

For ease of illustration, FIG. 21 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, the computing device 1000 may not have all of the components shown and/or may have other elements including other types of components instead of, or in addition to, those shown herein.

Although the description has been described with respect to particular embodiments thereof, these particular embodiments are merely illustrative, and not restrictive. For instance, certain embodiments discussed herein are particularly applicable to facilitating the addition of non-direct ancestor columns to a descendant worksheet of a client-side spreadsheet, which then provides context for users editing values on a descendant worksheet. However, embodiments are not necessarily limited to use with client-side spreadsheets that are integrated with server-side data resources. Various spreadsheet, database applications, graphics and visualization software, whether or not those applications run on a client device may benefit from enhanced flexibility to efficiently add pertinent context information to a given data display, where the pertinent data (for a given application) may be retrieved from other nodes, e.g., non-direct ancestors, in a family tree of data objects.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium having instructions to facilitate retrieving context information into a client-side worksheet of a spreadsheet, the non-transitory computer-readable storage medium executed by a computer to perform a process of:
   determining one or more non-direct ancestor data dimensions of one or more non-direct ancestor worksheets of a descendant worksheet in a hierarchically structured workbook of a spreadsheet, wherein a non-direct ancestor is any ancestor other than a parent;
   selectively retrieving the one or more non-direct ancestor data dimensions of the one or more non-direct ancestor worksheets via one or more servers via one or more web services or Application Programming Interfaces (APIs), resulting in one or more retrieved data dimensions;
   displaying the one or more retrieved data dimensions in the descendant worksheet in combination with one or more preexisting data dimensions of the descendant worksheet, wherein the one or more retrieved data dimensions are the one or more non-direct ancestor data dimensions of the one or more non-direct ancestor worksheets that were obtained by the selectively retrieving and wherein the descendent worksheet is in the hierarchical structured workbook of the spread sheet;
   receiving input in the descendant worksheet specifying a parent worksheet of the descendant worksheet, resulting in received input;
   using the received input to retrieve the one or more non-direct ancestor data dimensions from one or more ancestors of the parent worksheet for subsequent display in the descendant worksheet;
   detecting a modification to a first data dimension of the one or more preexisting data dimensions in the descendant worksheet; and
   receiving a signal to update data of a server-side data model corresponding to the first data dimension in response to the detecting.

2. The non-transitory computer-readable storage medium of claim 1, wherein the one or more retrieved data dimensions and the one or more preexisting data dimensions include one or more columns of data.

3. The non-transitory computer-readable storage medium of claim 2, wherein the one or more retrieved data dimensions include one or more columns of data, and wherein the one or more columns of data are read-only in the descendant worksheet.

4. The non-transitory computer-readable storage medium of claim 3, wherein retrieving further includes using a hierarchy traversal algorithm to determine the one or more columns of the one or more non-direct ancestor worksheets to retrieve for display in the descendant worksheet in accordance with predetermined workbook configuration information.

5. The non-transitory computer-readable storage medium of claim 4, wherein the hierarchy traversal algorithm includes:
   using indices assigned to each worksheet of a spreadsheet workbook to:
   traverse from the descendant worksheet to the parent worksheet of the descendant worksheet;
   traverse from the parent worksheet to a first non-direct ancestor worksheet, wherein the first non-direct ancestor worksheet represents a parent of the parent worksheet;
   retrieve one or more values from the first non-direct ancestor worksheet, wherein the one or more values includes a header of a first non-direct ancestor data dimension, and wherein the first non-direct ancestor data dimension represents a column of the first non-direct ancestor worksheet; and
   display the one or more values in the descendant worksheet in combination with a first data dimension, wherein the first data dimension represents an editable column of the descendant worksheet.

6. The non-transitory computer-readable storage medium of claim 1, wherein the spreadsheet is installed on a client system and includes an add-in for communicating with server-side data via one or more web services.

7. The non-transitory computer-readable storage medium of claim 6, wherein the server-side data is characterized by a data structure that is similar to a structure of the hierarchically structured workbook of the spreadsheet.

8. The non-transitory computer-readable storage medium of claim 1, wherein retrieving includes accessing a web service that is in communication with a remote server of the one or more servers to retrieve data corresponding to the one or more non-direct ancestor worksheets.

9. A method to facilitate retrieving context information into a client-side worksheet of a spreadsheet, the method comprising:
   determining one or more non-direct ancestor data dimensions of one or more non-direct ancestor worksheets of a descendant worksheet in a hierarchically structured workbook of the spreadsheet, wherein a non-direct ancestor is any ancestor other than a parent;
   selectively retrieving the one or more non-direct ancestor data dimensions of the one or more non-direct ancestor worksheets via one or more servers via one or more web services or Application Programming Interfaces (APIs), resulting in one or more retrieved data dimensions;
   displaying the one or more retrieved data dimensions in the descendant worksheet in combination with one or more preexisting data dimensions of the descendant worksheet, wherein the one or more retrieved data dimensions are the one or more non-direct ancestor data dimensions of the one or more non-direct ancestor worksheets that were obtained by the selectively retrieving and wherein the descendent worksheet is in the hierarchical structured workbook of the spread sheet;
   receiving input in the descendant worksheet specifying a parent worksheet of the descendant worksheet, resulting in received input;
   using the received input to retrieve the one or more non-direct ancestor data dimensions from one or more ancestors of the parent worksheet for subsequent display in the descendant worksheet;
   detecting a modification to a first data dimension of the one or more preexisting data dimensions in the descendant worksheet; and
   receiving a signal to update data of a server-side data model corresponding to the first data dimension in response to the detecting.

10. The method of claim 9, wherein the one or more retrieved data dimensions and the one or more preexisting data dimensions include one or more columns of data.

11. The method of claim 10, wherein the one or more retrieved data dimensions include one or more columns of data, and wherein the one or more columns of data are read-only in the descendant worksheet.

12. The method of claim 11, wherein retrieving further includes using a hierarchy traversal algorithm to determine the one or more columns of the one or more non-direct ancestor worksheets to retrieve for display in the descendant worksheet in accordance with predetermined workbook configuration information, and wherein the hierarchy traversal algorithm includes:
   using indices assigned to each worksheet of a spreadsheet workbook to:
   traverse from the descendant worksheet to the parent worksheet of the descendant worksheet;
   traverse from the parent worksheet to a first non-direct ancestor worksheet, wherein the first non-direct ancestor worksheet represents a parent of the parent worksheet;
   retrieve one or more values from the first non-direct ancestor worksheet, wherein the one or more values includes a header of a first non-direct ancestor data dimension, and wherein the first non-direct ancestor data dimension represents a column of the first non-direct ancestor worksheet; and
   display the one or more values in the descendant worksheet in combination with a first data dimension, wherein the first data dimension represents an editable column of the descendant worksheet.

13. The method of claim 9, wherein the spreadsheet is installed on a client system and includes an add-in for communicating with one or more server-side databases via one or more web services.

14. The method of claim 13, wherein the server-side data is characterized by a data structure that is similar to a structure of the hierarchically structured workbook of the spreadsheet.

15. The method of claim 9, wherein retrieving includes accessing a web service that is in communication with a remote server to retrieve data corresponding to the one or more non-direct ancestor worksheets.

16. An apparatus comprising:
   one or more processors; and
   logic encoded in one or more non-transitory media for execution by the one or more processors and when executed operable for:

determining one or more non-direct ancestor data dimensions of one or more non-direct ancestor worksheets of a descendant worksheet in a hierarchically structured workbook of a spreadsheet, wherein a non-direct ancestor is any ancestor other than a parent;

selectively retrieving the one or more non-direct ancestor data dimensions of the one or more non-direct ancestor worksheets via one or more servers via one or more web services or Application Programming Interfaces (APIs), resulting in one or more retrieved data dimensions;

displaying the one or more retrieved data dimensions in the descendant worksheet in combination with one or more preexisting data dimensions of the descendant worksheet, wherein the one or more retrieved data dimensions are the one or more non-direct ancestor data dimensions of the one or more non-direct ancestor worksheets that were obtained by the selectively retrieving and wherein the descendent worksheet is in the hierarchical structured workbook of the spread sheet;

receiving input in the descendant worksheet specifying a parent worksheet of the descendant worksheet, resulting in received input;

using the received input to retrieve the one or more non-direct ancestor data dimensions from one or more ancestors of the parent worksheet for subsequent display in the descendant worksheet;

detecting a modification to a first data dimension of the one or more preexisting data dimensions in the descendant worksheet; and receiving a signal to update data of a server-side data model corresponding to the first data dimension in response to the detecting.

* * * * *

UNITED STATES PATENT AND TRADEMARK OFFICE
CERTIFICATE OF CORRECTION

PATENT NO. : 12,260,170 B2  
APPLICATION NO. : 17/876327  
DATED : March 25, 2025  
INVENTOR(S) : Chen et al.

Page 1 of 1

It is certified that error appears in the above-identified patent and that said Letters Patent is hereby corrected as shown below:

On the Title Page

Column 2, item [57], Line 9, delete "form" and insert -- from --, therefor.

In the Specification

In Column 11, Line 47, delete "worksheet" and insert -- worksheet. --, therefor.

In Column 18, Line 5, delete "1-2" and insert -- 1-2. --, therefor.

In Column 20, Line 26, after "index" insert -- 0) --, therefor.

Signed and Sealed this  
Seventeenth Day of June, 2025

Coke Morgan Stewart  
*Acting Director of the United States Patent and Trademark Office*